(12) United States Patent
Takayama

(10) Patent No.: US 6,519,105 B1
(45) Date of Patent: Feb. 11, 2003

(54) RECORDING MEDIUM AND TAPE DRIVE DEVICE

(75) Inventor: Yoshihisa Takayama, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/457,859

(22) Filed: Dec. 10, 1999

(30) Foreign Application Priority Data

Dec. 11, 1998 (JP) .......................................... 10-353388

(51) Int. Cl.[7] .............................................. G11B 15/18
(52) U.S. Cl. ........................ 360/55; 360/48; 360/72.1; 360/69
(58) Field of Search ............................ 360/55, 69, 48, 360/72.1

(56) References Cited

U.S. PATENT DOCUMENTS 5,852,534 A * 12/1998 Ozue et al. .................. 360/69

* cited by examiner

Primary Examiner—David Hudspeth
Assistant Examiner—Varsha A. Kapadia
(74) Attorney, Agent, or Firm—Jay H. Maioli

(57) ABSTRACT

When a magnetic tape cassette which may include a memory in cassette (MIC) device storing a system log therein is loaded, on the basis of a system log allocation flag read out from the magnetic tape it is judged which one of the magnetic tape and the MIC should be used as a location of the system log to be preferentially used by the tape drive device. If the system log to be preferentially used exists in the MIC, but it is impossible to read out the system log from the MIC, the system log allocation flag of the magnetic tape is rewritten so that the system log to be preferentially used exists on the magnetic tape, whereby the tape cassette is afterwards handled as a tape cassette with no MIC on the system.

4 Claims, 19 Drawing Sheets

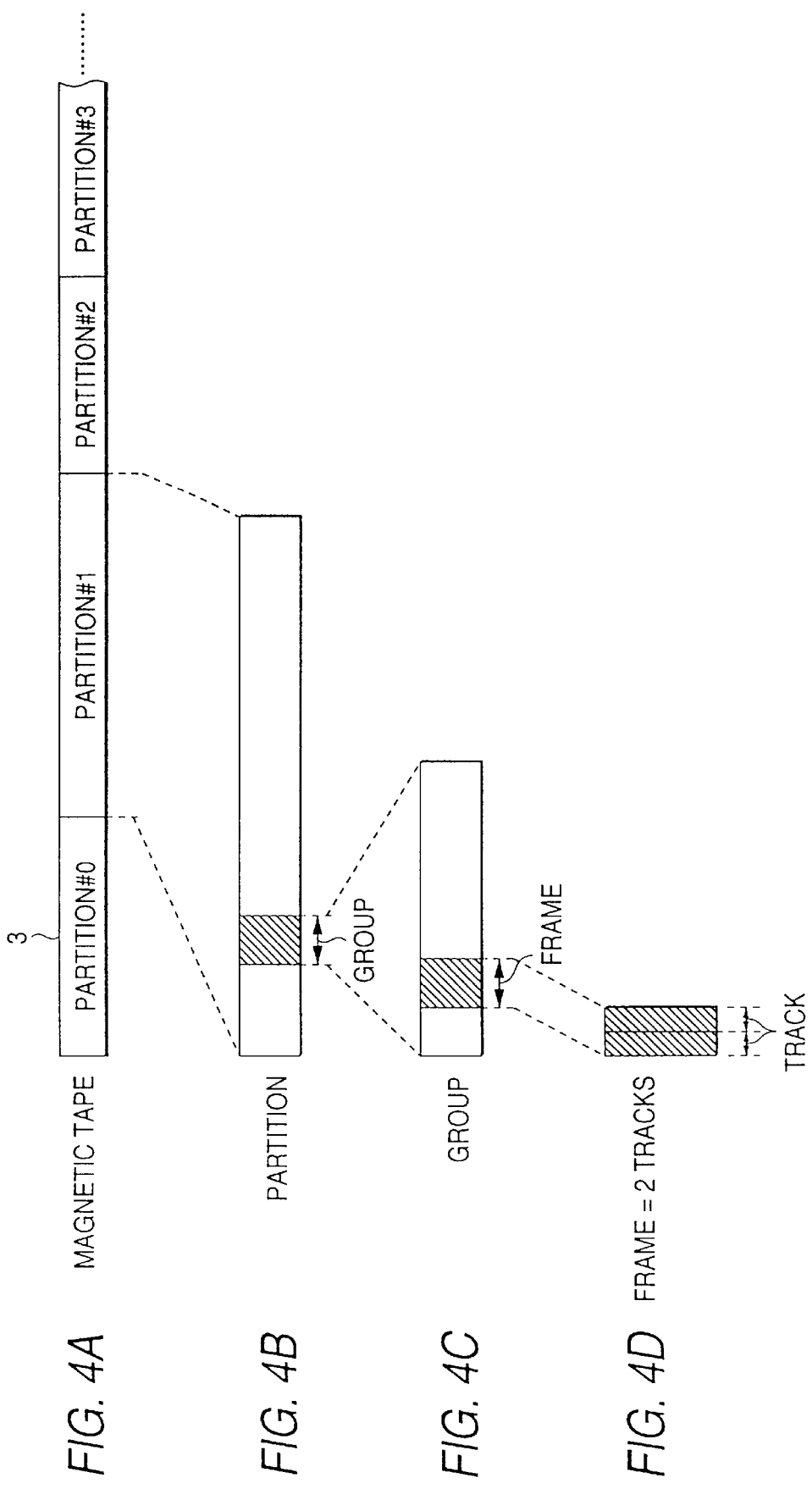

FIG. 9

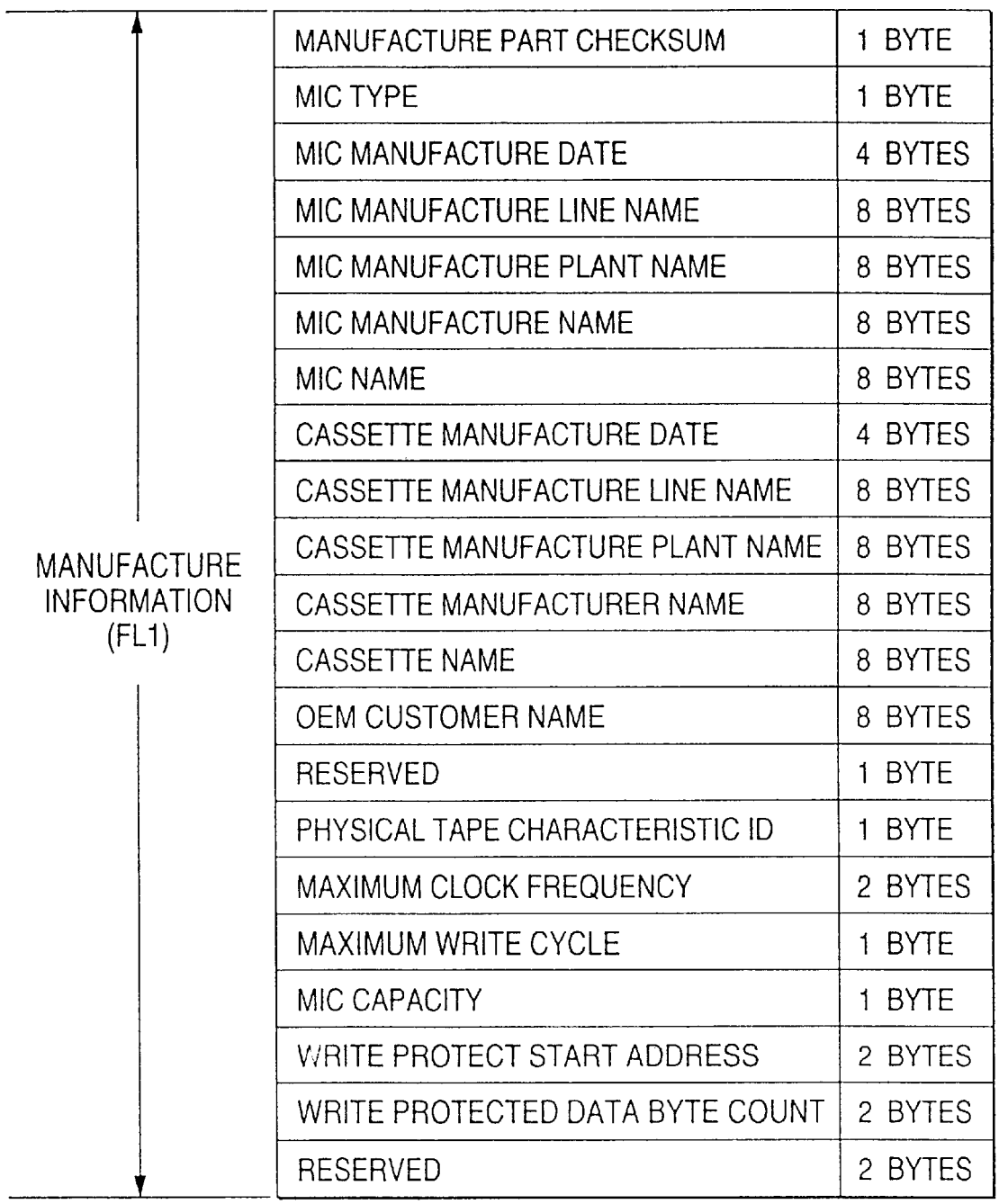

| MANUFACTURE INFORMATION (FL1) | | |
|---|---|---|
| | MANUFACTURE PART CHECKSUM | 1 BYTE |
| | MIC TYPE | 1 BYTE |
| | MIC MANUFACTURE DATE | 4 BYTES |
| | MIC MANUFACTURE LINE NAME | 8 BYTES |
| | MIC MANUFACTURE PLANT NAME | 8 BYTES |
| | MIC MANUFACTURE NAME | 8 BYTES |
| | MIC NAME | 8 BYTES |
| | CASSETTE MANUFACTURE DATE | 4 BYTES |
| | CASSETTE MANUFACTURE LINE NAME | 8 BYTES |
| | CASSETTE MANUFACTURE PLANT NAME | 8 BYTES |
| | CASSETTE MANUFACTURER NAME | 8 BYTES |
| | CASSETTE NAME | 8 BYTES |
| | OEM CUSTOMER NAME | 8 BYTES |
| | RESERVED | 1 BYTE |
| | PHYSICAL TAPE CHARACTERISTIC ID | 1 BYTE |
| | MAXIMUM CLOCK FREQUENCY | 2 BYTES |
| | MAXIMUM WRITE CYCLE | 1 BYTE |
| | MIC CAPACITY | 1 BYTE |
| | WRITE PROTECT START ADDRESS | 2 BYTES |
| | WRITE PROTECTED DATA BYTE COUNT | 2 BYTES |
| | RESERVED | 2 BYTES |

FIG. 12

| | | |
|---|---|---|
| FL31 | VOLUME INFORMATION CHECKSUM | 1 BYTE |
| | VOLUME INFORMATION | 100 BYTES |
| | ACCUMULATIVE PARTITION INFORMATION CHECKSUM | 1 BYTE |
| | ACCUMULATIVE PARTITION INFORMATION | 56 BYTES |
| | VOLUME NOTE CHECKSUM | 1 BYTE |
| | VOLUME NOTE | 8 BYTES |
| VOLUME TAG (FL3) | CARTRIDGE SERIAL NUMBER | 32 BYTES |
| | MANUFACTURER ID | 1 BYTE |
| | SECONDARY ID | 1 BYTE |
| | CARTRIDGE SERIAL NUMBER PART CHECKSUM | 1 BYTE |
| | RESERVED | 1 BYTE |
| | SPECIFIC VOLUME TAG 1 | 36 BYTES |
| | SPECIFIC VOLUME TAG 2 | 36 BYTES |
| | SPECIFIC VOLUME TAG 3 | 36 BYTES |
| | SPECIFIC VOLUME TAG 4 | 36 BYTES |
| | SPECIFIC VOLUME TAG 5 | 36 BYTES |
| | SPECIFIC VOLUME TAG 6 | 36 BYTES |
| | SPECIFIC VOLUME TAG 7 | 36 BYTES |
| | SPECIFIC VOLUME TAG 8 | 36 BYTES |
| | SPECIFIC VOLUME TAG 9 | 36 BYTES |
| | SPECIFIC VOLUME TAG 10 | 36 BYTES |
| | SPECIFIC VOLUME TAG 11 | 36 BYTES |
| | SPECIFIC VOLUME TAG 12 | 36 BYTES |
| | SPECIFIC VOLUME TAG 13 | 36 BYTES |

FIG. 13

VOLUME INFORMATION

| VOLUME INFORMATION CHECKSUM | EJECT STATUS | REEL DIAMETER | RESERVED | INITIALIZE COUNT | VOLUME INFORMATION ON TAPE |
|---|---|---|---|---|---|
| 1 BYTE | 20 BYTES | 4 BYTES | 1 BYTE | 3 BYTES | 72 BYTES |

VOLUME INFORMATION ON TAPE

| | | | | FL312 (72 BYTES) |
|---|---|---|---|---|
| RESERVED | | | 4 BYTES | |
| RESERVED | | | 2 BYTES | |
| RESERVED | b6, b7, b8 | 3 BITS | | |
| SUPER HIGH SPEED SEARCH ENABLE FLAG | b5 | 1 BIT | 1 BYTE | |
| SYSTEM LOG ALLOCATION FLAGS | b3, b4 | 2 BITS | | |
| ALWAYS UNLOAD PBOT FLAG | b2 | 1 BIT | | |
| AIT NATIVE FLAG | b1 | 1 BIT | | |
| LAST VALID PARTITION NUMBER | | | 1 BYTE | |
| OPTIONAL DEVICE AREA ALLOCATION MAP | | | 32 BYTES | |
| RESERVED | | | 32 BYTES | |

SYSTEM LOG ALLOCATION FLAG (FL312a)

| b4 | b3 | DEFINITION |
|----|----|------------|
| 0  | 0  | THERE ARE SYSTEM LOGS ONLY ON TAPE |
| 0  | 1  | THERE IS NO SYSTEM LOGS BOTH ON TAPE AND IN THE MIC |
| 1  | 0  | THERE ARE SYSTEM LOGS BOTH ON TAPE AND IN THE MIC |
| 1  | 1  | THERE IS NO SYSTEM LOGS ONLY IN THE MIC |

FIG. 18

PARTITION INFORMATION

| | | | |
|---|---|---|---|
| PREVIOUS GROUPS WRITTEN | | 4 BYTES | |
| TOTAL GROUPS WRITTEN | | 4 BYTES | |
| RESERVED | | 1 BYTE | |
| PREVIOUS GROUPS READ | | 3 BYTES | |
| TOTAL GROUPS READ | | 4 BYTES | |
| RESERVED | | 1 BYTE | |
| TOTAL REWRITTEN FRAMES | | 3 BYTES | |
| RESERVED | | 1 BYTE | |
| TOTAL 3RD ECC COUNT | | 3 BYTES | |
| ACCESS COUNT | | 4 BYTES | |
| UPDATE REPLACE COUNT | | 4 BYTES | |
| PREVIOUS REWRITTEN FRAMES | | 2 BYTES | 48 BYTES |
| PREVIOUS 3RD ECC COUNT | | 2 BYTES | |
| RESERVED | | 1 BYTE | |
| LOAD COUNT | | 3 BYTES | |
| RESERVED | | 1 BYTE | |
| VALID MAXIMUM ABSOLUTE FRAME COUNT | | 3 BYTES | |
| FLAG BYTE | BIT 1 | PREVENT WRITE | 1 BYTE |
| | BIT 2 | PREVENT READ | |
| | BIT 3 | PREVENT WRITE RETRY | |
| PARTITION ATTRIBUTE FLAG | BIT 4 | PREVENT READ RETRY | |
| | BIT 5 | RESERVED | |
| | BIT 6 | RESERVED | |
| | BIT 7 | RESERVED | |
| | BIT 8 | PARTITION OPEN CLOSE FLAG | |
| MAXIMUM ABSOLUTE FRAME COUNT | | 3 BYTES | |

FIG. 19

SUPER HIGH SPEED SEARCH MAP CELL

| LINK INFORMATION | 8 BYTES |
|---|---|
| SUPER HIGH SPEED SEARCH MAP | |

RECORDING MEDIUM AND TAPE DRIVE DEVICE

BACKGROUND OF THE INVENTION

1. Field of the Invention

The present invention relates to a tape drive device which is suitably usable for a tape cassette serving as a recording medium used for data storage, etc.

2. Description of the Related Art

A so-called tape streaming drive has been known as a drive device which is able to record/reproduce digital data in a magnetic tape. Such a tape streaming drive can have an extremely large recording capacity, for example, of about several tens to several hundreds gigabytes although its capacity is dependent on the tape length of a tape cassette serving as a recording medium. Therefore, the tape streaming device has been widely used in various fields, for example, to back up data recorded in a medium such as a hard disc of the main body of a computer. Further, it is also suitably used to store image data or other data having a large data size.

As the above tape streaming drive has been proposed one which uses a 8-mm VTR tape cassette as a recording medium and utilizes a helical scan system based on a rotational head to record/reproduce data.

The tape streaming drive proposed is designed so that a user can form partitions of desired number and capacity on a magnetic tape of a tape cassette by initializing the magnetic tape of the tape cassette. Accordingly, user data can be recorded into a data area formed every partition and user data thus recorded can be reproduced from a data area formed every partition.

In order to perform a proper recording/reproducing operation on a magnetic tape of a tape cassette in a data storage system comprising a tape streaming drive and a tape cassette as described above, various position information on the magnetic tape and information on the use record of the magnetic tape, etc. are required as management information which is used to manage the recording/reproducing operation, etc. by the tape streaming drive.

Therefore, it is considered that an area for the management information as described above is provided at the head position of the magnetic tape or it is individually provided at the head position of each partition formed on the magnetic tape.

At the tape streaming drive side, various processing operations are carried out so that the area of the management information is accessed to read out desired management information before the data recording or reproducing operation is carried out on the magnetic tape and the subsequent recording/reproducing operation is properly carried out on the basis of the management information.

After the data recording or reproducing operation is completed, in order to rewrite the content of the management information which is required to be altered due to the execution of the recording/reproducing operation, the area for the management information is accessed again to rewrite the content of the information and then the processing waits for a next recording/reproducing operation. Thereafter, the tape cassette is unloaded and ejected by the tape streaming drive.

However, when the recording/reproducing operation is carried out on the basis of the management information described above, the tape streaming drive is required to access the management information area at the head of the magnetic tape or the head of the partition at the start time when each of the recording and reproducing operations is carried out and also access the management information area again at the end time when the operation is completed to perform data writing/reading operation. That is, it is impossible to perform the loading or unloading operation of the tape at some midpoint on the magnetic tape at which the data recording/reproducing is completed.

In the case of the tape streaming drive, the magnetic tape must be physically fed for access and thus it takes a long time to access the management information area at the head of the magnetic tape or at the head of the partition when the recording/reproducing operation is completed. Particularly, when the data recording/reproducing operation is completed at a position on the magnetic tape which is physically far away from the management information area on the magnetic tape, the magnetic tape must be fed by the amount corresponding to the distance between the operation-completed position and the management information area, and thus it needs extra time.

As described above, in a data storage system using a tape cassette as a medium, a relatively long time is needed to complete one recording/reproducing operation, that is, to perform a series of access operations to be carried out from the time when the loading of the magnetic tape is started until the time when the unloading of the magnetic tape is finally finished. However, it is preferable to reduce the time required for the series of access operations as much as possible.

In view of the foregoing situation, there has been developed such a technique that a non-volatile memory or the like is provided in the housing of a tape cassette and management information is stored in the non-volatile memory. A tape streaming drive supporting such a tape cassette is provided with an interface for writing/reading data into/from the non-volatile memory, and reads/writes the management information on the data recording/reproducing operation for the magnetic tape from/into the non-volatile memory. With this construction, it is unnecessary to rewind the magnetic tape to the tape top position thereof when the magnetic tape is loaded/unloaded, and thus the loading/unloading operation of the magnetic tape can be performed at any position even when the magnetic tape is located at some midpoint.

In the present situation, from the viewpoint of the above technical background of the related art, there is required a tape streaming drive having a compatible function which supports both of a tape cassette type having a non-volatile memory and a tape cassette type having no non-volatile memory.

For the tape streaming drive having the compatible function as described above, it is preferable from the viewpoint of reliability that its functionality as equipment is enhanced as much as possible on the assumption that it has the compatible function.

For example, with respect to the tape cassette having the non-volatile memory (hereinafter merely referred to as "memory"), it must be taken into consideration that there may occur such a situation that it is impossible to read data from the memory due to failure of the connection point of the memory or the like. In addition, the tape streaming drive is also required to smoothly perform the recording/reproducing operation on the magnetic tape even when the above situation occurs.

SUMMARY OF THE INVENTION

The present invention has been implemented in view of the foregoing problems, and has an object to enhance reliability and functionality as equipment in a tape streaming drive having a compatible function for both of a tape cassette having a non-volatile memory and a tape cassette having no non-volatile memory.

Therefore, according to a first aspect of the present invention, there is provided a recording medium in which a magnetic tape is accommodated in a tape cassette, characterized in that the magnetic tape has a management information area in which desired management information to manage the recording/reproducing operation on the magnetic tape is recorded, and the tape cassette is provided with a memory for storing management information having the information content corresponding to management information recorded in the management information area, wherein the management information area contains an area for recording management information location identifying information which indicates the location of preferential management information which should be preferentially referred to by a tape drive device for performing a recording/reproducing operation in conformity with the tape cassette.

According to a second aspect of the present invention, there is provided a tape drive device which performs a recording/reproducing operation in conformity with a tape cassette with a magnetic tape having a management information area in which management information to manage the recording/reproducing operation on the magnetic tape is recorded, characterized by comprising: tape drive means for recording or reproducing information on or from a magnetic tape of a loaded tape cassette; memory drive means for reading out from or writing into a memory management information having the information content common to management information to be recorded in the management information area on the loaded tape cassette when the management information concerned is recorded in the memory; detection means for detecting management information location identifying information indicating the location of preferential management information to be preferentially referred to by the tape drive device from the management information read out from the magnetic tape by the tape drive means; and control means for identifying the location of the preferential management information on the basis of the management information location identifying information detected by the detection means and controlling the memory drive means so that when it is identified that the preferential management information exists in the memory, a reading trial operation of the management information stored in the memory is carried out, wherein when it is impossible to read out the management information from the memory as a result of the reading trial operation of the management information, the control means controls the tape drive means so as to write into a management information recording area of the magnetic tape the management information location identifying information indicating that the preferential management information exists in the management information recording area on the magnetic tape.

According to each of the recording medium and the tape drive device thus constructed, when a tape cassette which may be provided with a memory having management information stored therein is loaded, on the basis of the management information location identifying information set as one management information in the magnetic tape, the tape drive device can identify whether one of the magnetic tape and the memory should be selected as a location of the management information to be preferentially used.

In addition, in a case where it is identified on the basis of the management information location identifying information read out from the magnetic tape that the management information to be preferentially used is located in the memory, if it is impossible to read out the management information from the memory due to some cause, the content of the management information location identifying information is rewritten to indicate that the management information to be preferentially used is located in the magnetic tape. Through this operation, the tape cassette is allowed to be subsequently handled as a tape cassette having no memory on the system.

Further, in a case where it is identified on the basis of the management information location identifying information read out from the magnetic tape that the management information to be preferentially used is located in the magnetic tape, the tape drive device is enabled to subsequently perform a recording/reproducing operation which is conformable to a tape cassette having no memory.

BRIEF DESCRIPTION OF THE DRAWING

FIGS. 4A to 4D are diagrams showing the data structure recorded in a magnetic tape;

FIG. 9 is a diagram showing a manufacture part of MIC of the embodiment;

FIG. 12 is a diagram showing a volume tag of MIC of the embodiment;

FIG. 13 is a diagram showing volume information of MIC of the embodiment;

FIG. 14 is a diagram showing a volume information on tape of MIC of the embodiment;

FIG. 15 is a diagram showing a system log allocation flag of MIC of the embodiment;

FIG. 18 is a diagram showing partition information of MIC of the embodiment;

FIG. 19 is a diagram showing a super high speed search map cell of the embodiment;

DETAILED DESCRIPTION OF THE PREFERRED EMBODIMENT

Figure 1:
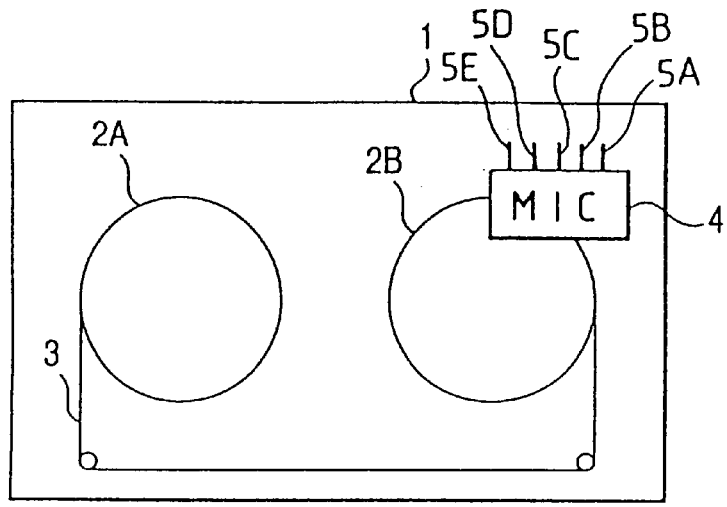
FIG. 1 is a diagram schematically showing the internal construction of a tape cassette according to the embodiment.

A preferred embodiment of the present invention will be described hereunder with reference to the accompanying drawings.

The same applicant as this application has proposed inventions on a tape cassette having a non-volatile memory and a tape drive device which constitutes a data storage system, and the invention of this application is applied to a data storage system which supports a tape cassette having a memory and is capable of recording/reproducing digital data. The non-volatile memory equipped in the tape cassette is assumed to be MIC (Memory In Cassette).

The description will be made in the following order.

1. Construction of tape cassette
2. Construction of tape streaming drive
3. Data structure on magnetic tape
4. Data structure of MIC
5. Compatible support operation of tape streaming drive
6. System log allocation recognition processing 1. Construction of Tape Cassette First, a tape cassette with MIC which is conformable to a tape streaming drive of this embodiment will be described with reference to FIGS. 1 and 2.

FIG. 1 conceptually shows the internal construction of the tape cassette. Reel hubs 2A, 2B are provided inside the tape cassette 1 shown in FIG. 1, and a magnetic tape 3 having a tape width of 8 mm is suspended between the reel hubs 2A and 2B.

The tape cassette 1 is provided with MIC 4 such as a non-volatile memory, and five terminals 5A, 5B, 5C, 5D and 5E are lead out from the module of MIC 4. These terminals 5A to 5E serve as power supply terminal, a data input terminal, a clock input terminal, an earth terminal, a preliminary terminal, etc., respectively. More specifically described later, various information relating to the manufacturing date (year, month, day) and the manufacturing place of each tape cassette, the thickness and length of the tape, the material of the tape, use record of recording data every partition formed on the tape 3, etc., user information, etc. are stored in MIC 4. In this specification, various information stored in MIC 4 will be referred to as "management information".

Figure 2:
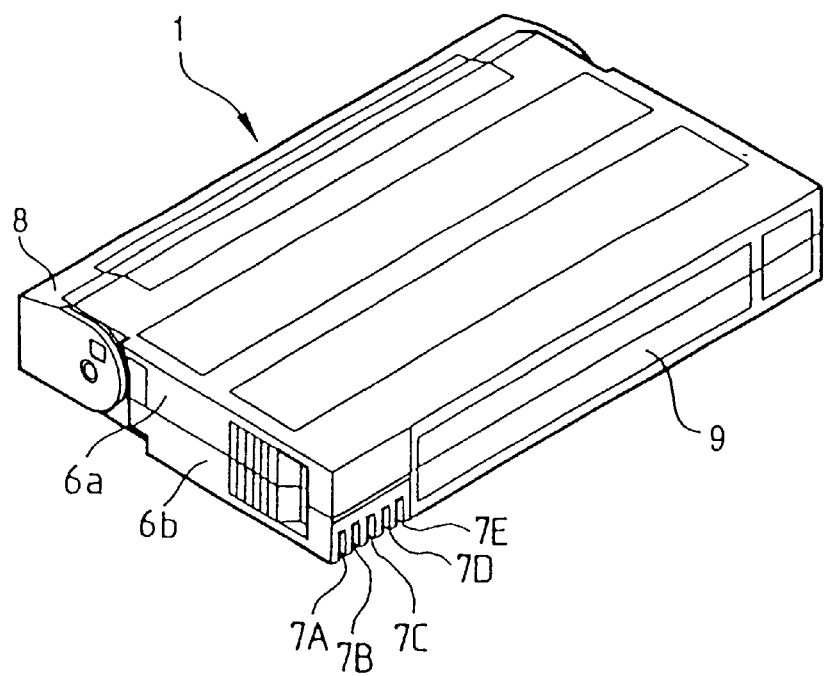
FIG. 2 is a perspective view showing the outlook of the tape cassette of the embodiment.

FIG. 2 shows the outlook of the tape cassette 1. The whole housing of the tape cassette 1 comprises an upper case 6a, a lower case 6b and a lid member 8, and it is basically the same construction as a tape cassette used for a normal 8-mm VTR. Terminal pins 7A, 7B, 7C, 7D and 7E are provided to a label face 9 on the side surface of the tape cassette 1 so as to be connected to the above terminals 5A to 5E, respectively described in FIG. 1. That is, in this embodiment, the tape cassette 1 is brought into physical contact with the tape streaming drive 10 described next through the terminal pins 7A to 7E to perform mutual transmission of data signals, etc.

2. Construction of Tape Streaming Drive

Next, the construction of the tape streaming drive 10 of this embodiment will be described with reference to FIG. 3. The tape streaming drive 10 is designed to perform the recording/reproducing operation on the magnetic tape 3 of the loaded tape cassette 1 according to a helical scan system.

Two recording heads 12A and 12B having different azimuth angles and three reproducing heads 13A to 13C having desired azimuth angles are secured to a rotational drum 11 so as to be arranged at predetermined angular intervals.

The rotational drum 11 around which the magnetic tape 3 drawn out from the tape cassette 1 is wound is rotated by a drum motor 14A. A capstan (not shown) for feeding the magnetic tape 3 at a fixed speed is rotated by a capstan motor 14B. The reel hubs 2A and 2B in the tape cassette 1 are independently rotated forwardly or backwardly by reel motors 14C and 14D, respectively.

A loading motor 14E drives a loading mechanism (not shown) to perform the loading/unloading operation of the magnetic tape 3 into/from the rotational drum 11.

The drum motor 14A, the capstan motor 14B, the reel motors 14C and 14D and the loading motor 14E are rotated by applying power thereto from a mechanical driver 17. The mechanical driver 17 drives each motor under the control of a servo controller 16. The servo controller 16 controls the rotational speed of each motor to perform the tape feeding operation for a normal recording/reproducing operation, the tape feeding operation for a high-speed reproducing operation, the tape feeding operation for a fast feeding/rewinding operation, a tape cassette loading operation, a loading/unloading operation, a tape tension control operation, etc.

In order for the servo controller 16 to perform the servo control of each motor, each of the drum motor 14A, the capstan motor 14B and the reel motors 14C and 14D is provided with FG (frequency generator) (not shown) to detect the information on the rotational motion of each motor.

The servo controller 16 identifies the rotational speed of each motor on the basis of an FG pulse generated from each FG, detects an error (displacement) from a target rotational speed for the rotational motion of each motor and controls the mechanical driver 17 by applying the power corresponding to the error to the mechanical driver 17, thereby performing the rotational speed control based on a closed loop. Accordingly, during the normal tape feeding for the recording/reproducing operation and various operations such as the high-speed search operation, the fast feeding operation, the rewinding operation, etc., the servo controller 16 can control each motor so that each motor is rotated at a target rotational speed which is conformable to each operation.

In EEP-ROM 18 are stores constants, etc. which are used for the servo control of the respective motors by the servo controller 16.

The servo controller 16 is interactively connected to a system controller 15 for performing the control of the whole system through an interface controller/ECC formatter 22 (hereinafter referred to as "IF/ECC controller").

In the tape streaming drive 10, an SCSI interface 20 is used at the input/output of data. For example, sequential data comprising fixed-length records each of which constitutes a transmission data unit are input through the SCSI interface 20 from a host computer 40 in the data recording operation, and supplied to a compression/expansion circuit 21. Such a tape streaming drive system also contains a mode in which data are transmitted in the form of an assembly of variable-length data from the host computer 40.

In the compression/expansion circuit 21, data input thereto are subjected to compression processing according to a desired compression system if necessary. If a compression system based on LZ encoding is adopted as one compression style, exclusive codes are allocated to character arrays which were previously processed, and these codes are stored in the form of a dictionary. A character array which is afterwards input is compared with the content of the dictionary, and if the character array of the input data is coincident with some code of the dictionary, the character array data are replaced by the code of the dictionary. If the character array input is not coincident with any code of the dictionary, a new code is allocated to this character array data, and registered in the dictionary. As described above, the data of input character arrays are registered in the dictionary, and replaced by the codes of the dictionary, thereby compressing the data.

The output of the compression/expansion circuit 21 is supplied to an IF/ECC controller 22, and it is temporarily accumulated in a buffer memory 23 under the control operation of the IF/ECC controller 22. Under the control of the IF/ECC controller 22, the data thus accumulated in the buffer memory 23 are finally handled in the form of a group which is a fixed-length unit corresponding to 40 tracks of the magnetic tape, and the data are subjected to ECC format processing.

As the ECC format processing, recording data are added with an error correction code and then subjected to modulation processing so that the data are conformable to the magnetic recording. Thereafter, the data are supplied to an RF processor 19.

In the RF processor 19, the recording data thus supplied are subjected to amplification, recording equalizing processing, etc. to generate recording signals, and the recording signals thus generated are supplied to the recording heads 12A and 12B, whereby the data recording operation on the magnetic tape 3 is carried out from the recording heads 12A and 12B.

The data reproducing operation will be briefly described.

The recording data of the magnetic tape 3 are read out as an RF reproduced signal by the reproducing heads 13A and 13B, and the reproduced outputs thus read out are subjected to reproduction equalization, reproduction clock generation, binarization, decoding (for example, viterbi decoding), etc in the RF processor 19.

The signals thus read out are supplied to the IF/ECC controller 22, and first subjected to the error correction processing, etc. The data thus processed are temporarily accumulated in the buffer memory 23. The data thus accumulated are read out at a predetermined time and supplied to the compression/expansion circuit 21.

On the basis of the judgment of the system controller 15, data are subjected to the data expansion processing in the compression/expansion circuit 21 if the data have been compressed in the compression/expansion circuit 21 in the recording operation, or passed through the data expansion processing with no data expansion processing and output therefrom if the data are non-compressed data.

The output data of the compression/expansion circuit 21 are output as reproduced data through the SCSI interface 20 to the host computer 40.

Figure 3:
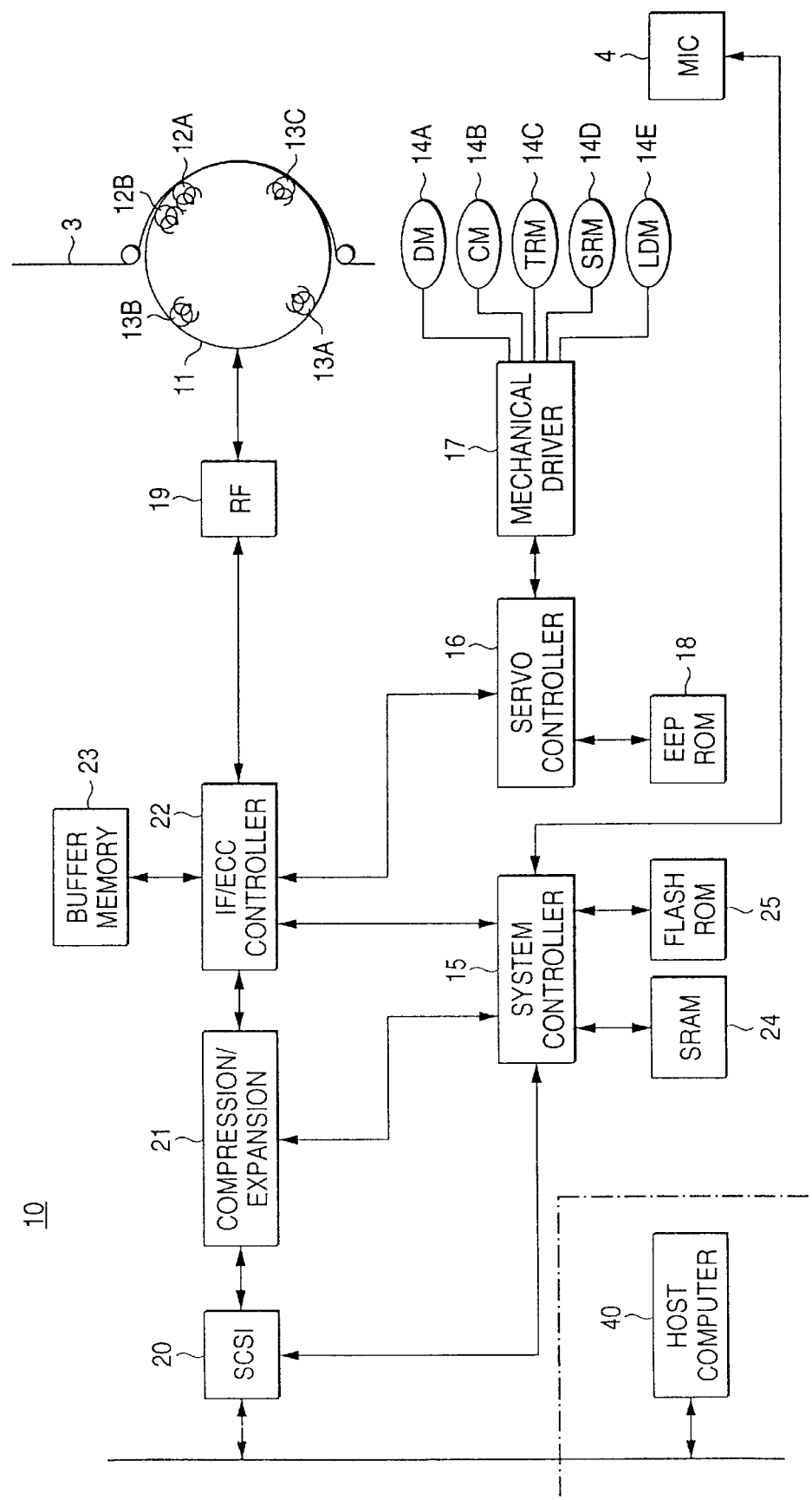
FIG. 3 is a block diagram showing a tape streaming drive of an embodiment of the present invention.

In FIG. 3, MIC 4 as well as the magnetic tape 3 of the tape cassette 1 is illustrated. When the main body of the tape cassette is loaded into the tape streaming drive, MIC 4 is connected to the system controller 15 through the terminal pins 7A to 7E shown in FIG. 2 so that the data can be input/output therebetween, whereby the system controller 15 is allowed to read the management information recorded in MIC 4 and renew the management information.

The mutual transmission of information can be performed between MIC 4 and the external host computer 40 by using commands of SCSI. Therefore, it is unnecessary to provide a special-purpose line between MIC 4 and the host computer 40, so that the data communication between the tape cassette and the host computer 40 is enabled by connecting the tape cassette and the host computer 40 through only the SCSI interface.

As described above, the mutual transmission of information is carried out between the tape streaming drive 10 and the host computer 40 by using the SCSI interface 20, and the host computer 40 performs various communications with the system controller 15 by using the SCSI commands.

Accordingly, the host computer 40 instructs the system controller 15 on the basis of the SCSI commands to execute the data writing/reading operation on MIC 4.

Data which are used for various processing by the system controller 15 are stored in S-RAM 24, a flash ROM 25. For example, constants, etc. used for control are stored in the flash ROM 25. S-RAM 24 is used as a work memory or a memory used to store data to be read out from MIC 4, data to be written into MIC 4, mode data set on a tape cassette basis, various flag data, etc., perform operational processing on these data, etc.

S-RAM 24, the flash ROM 25 may be fabricated as an internal memory of a microcomputer constituting the system controller 15, and a part of the area of the buffer memory 23 may be used as a work memory.

The mode set on the basis of the tape cassette basis is a mode which is set for an individual tape cassette 1 itself, and it is divided into a normal mode and a multi-partition mode.

The normal mode is defined as a mode in which the tape cassette 1 is used in the form of one partition or two partitions, and the multi-partition mode is defined as a mode in which the tape cassette 1 is used in the form of three or more partitions. In the multi-partition mode, the loading/unloading operation at each partition position (that is, at some midpoint on the magnetic tape) can be performed.

If no mode is set in the tape cassette 1 (or the mode of the tape cassette 1 is required to be initialized and altered), the tape streaming drive 10 executes the mode setting. If the tape cassette 1 having the mode set therein is loaded, the system controller 15 sets the operation mode to the mode of the tape cassette 1.

For the tape cassette with MIC as described above, any one of the multi-partition mode and the normal mode is arbitrarily selected. However, for the tape cassette with no MIC, only the normal mode is selected.

3. Data Structure on Magnetic Tape

Next, the data format on the magnetic tape 3 of the tape cassette 1 on which the recording/reproducing operation is carried out by the above tape streaming drive 10 will be schematically described.

FIGS. 4A to 4D are diagrams showing the structure of data recorded on the magnetic tape 3.

FIG. 4A schematically shows a magnetic tape 3. The magnetic tape 3 of this embodiment is designed to be used while being divided into partitions as shown in FIG. 4A. In the system of this embodiment, partitions whose maximum number is equal to 256 can be set and managed. The respective partitions shown in FIG. 4A are provided with partition numbers like partitions #0, #1, #2, #3, . . . for the management.

Accordingly, according to this embodiment, each partition can be individually and independently subjected to the data recording/reproducing operation. The recording unit of the data in one partition shown in FIG. 4B can be divided into fixed-length units each of which is called as "group" shown in FIG. 4C, and the recording operation on the magnetic tape 3 is carried out on a group basis.

In this case, one group corresponds to the data amount of 20 frames, and one frame is composed of 2 tracks as shown in FIG. 4D. In this case, two tracks constituting one frame are composed of tracks which are adjacent to each other and have plus azimuth and minus azimuth. Accordingly, one group is composed of 40 tracks.

Figure 5A:
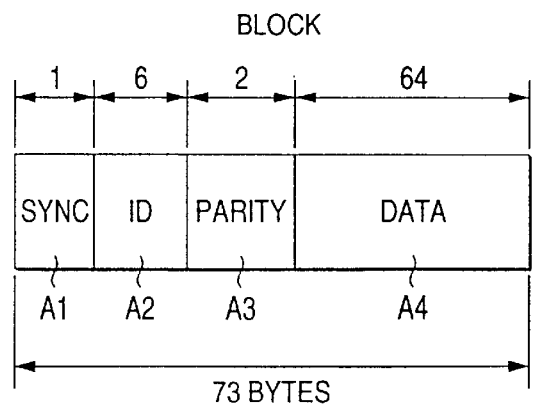
FIGS. 5A to 5C are schematic diagrams showing the data structure of one track.
Figure 5B:
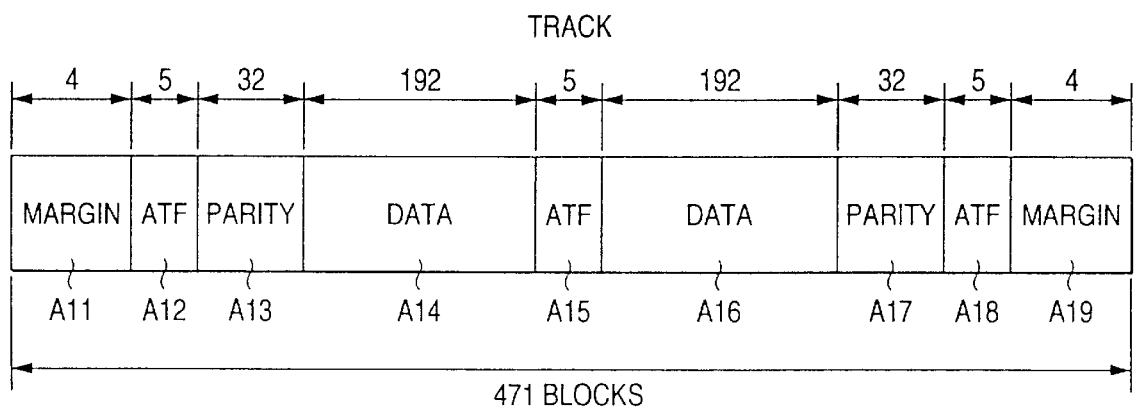

The structure of the data of one track shown in FIG. 4D is shown in FIGS. 5A and 5B. FIG. 5A shows the data structure of each block. A block is composed of a 1-byte SYNC data area A1, a 6-byte ID area A2 used for search, etc., a 2-byte error correcting parity area A3 for ID data, and a 64-byte data area A4.

The data of one track shown in FIG. 5B are composed of 471 blocks. As shown in FIG. 5B, each track is provided with 4-block margin areas A11 and A19 at both ends thereof, and tracking controlling ATF areas A12 and A18 are provided at the rear side of the margin A11 and at the front side of the margin A19, respectively. Further, parity areas A13, A17 are provided at the rear side of the ATF area A12 and at the front side of the ATF area A18. An area of 32 blocks is provided as each of the parity areas A13, A17.

An ATF area A15 is provided in the middle of each track. An area of 5 blocks is provided as each of the ATF areas A12, A15 and A18. Further, a data area A14 of 192 blocks is provided between the parity area A13 and the ATF area A15 and a data area A16 is provided between the ATF area A15 and the parity area A17. Accordingly, all the data areas (A14 and A16) in one track occupy 192×2=384 blocks of all the 471 blocks.

Figure 5C:
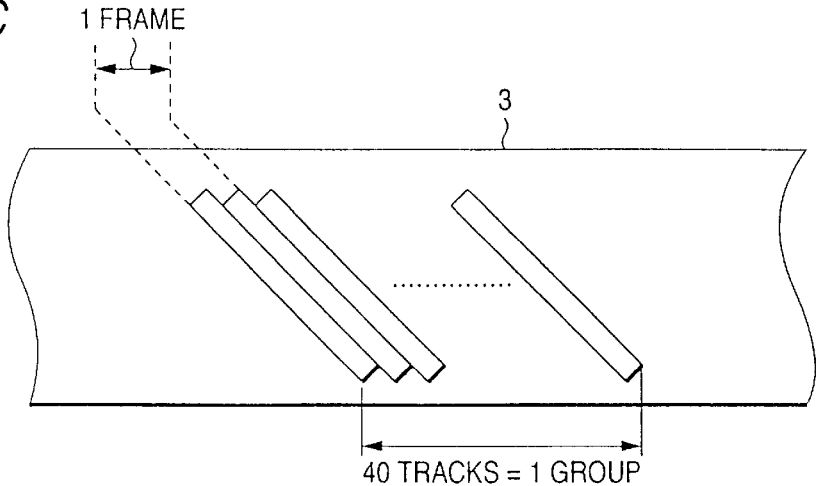

The above track is physically recorded on the magnetic tape 3 as shown in FIG. 5C, and 40 tracks (=20 frames) are set as one group as described above.

The data are recorded on the magnetic tape 3 shown in FIGS. 4 and 5 in the area structure shown in FIG. 6. In the following description, it is assumed that partitions of N (#0 to #N−1) are formed.

Figure 6A:
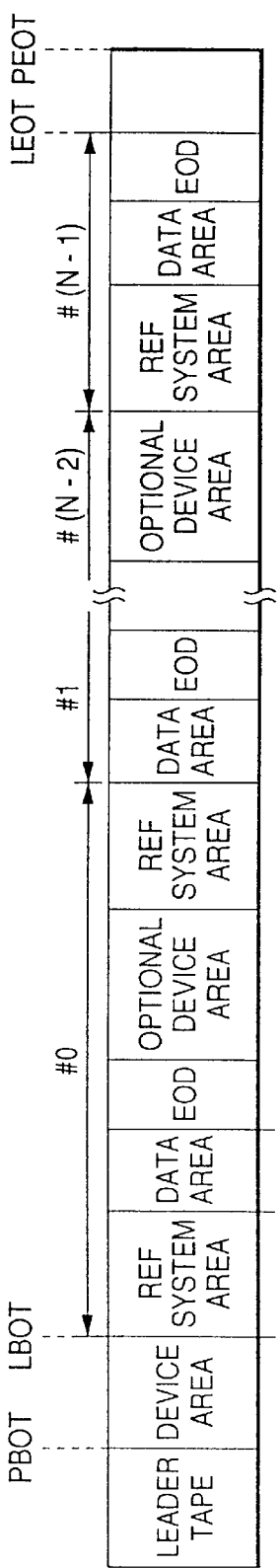
FIGS. 6A to 6C are diagrams showing the structure of areas on the magnetic tape.

As shown in FIG. 6A, a leader tape is physically located at the head of a first portion of the magnetic tape, and a device area serving as an area for loading/unloading of the tape cassette is provided subsequently to the leader tape. The head of the device area is set as the head position of the physical tape PBOT (Physical Beginning of Tape).

Subsequently to the device area are provided a reference area on the partition #0 and a system area in which use record information of the tape, etc. are recorded (hereinafter referred to as a system area, containing the reference area), and subsequently to the system area is provided a data area. The head of the system area is set as the logical start position of the tape LBOT (Logical Beginning of Tape).

Figure 6B:
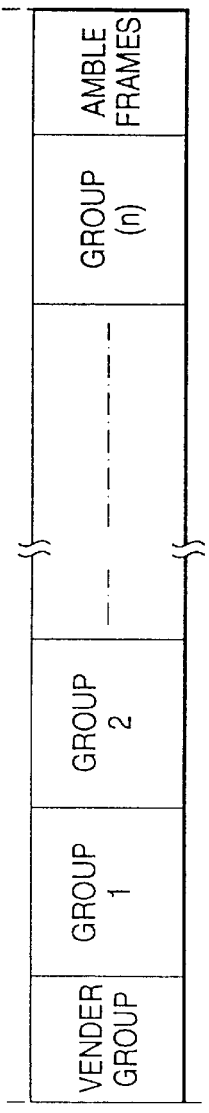
Figure 6C:
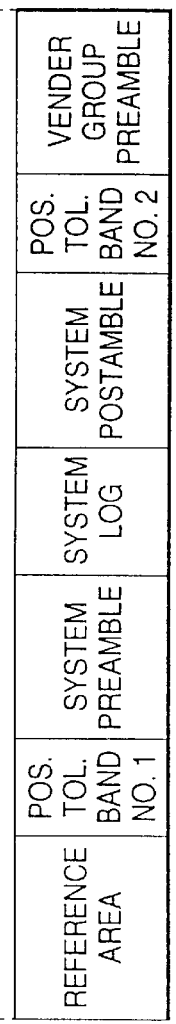

As shown in enlarged view of FIG. 6C, the system area includes a reference area, a position tolerance band No. 1, a system preamble, a system log, a system postamble, a position tolerance band No. 2, and a vender group preamble.

A data area subsequent to the above system area is provided with a vender group indicating information on a vender which first creates and supplies data as shown in enlarged view of FIG. 6B. Subsequently, plural groups (group 1, . . . , group (n)) like the group shown in FIG. 4C are sequentially formed. Finally, an amble frame is disposed subsequently to the final group (n).

Subsequently to the above data area is provided EOD (End of Data) indicating the end of the data area of the partition as shown in FIG. 6A.

When only one partition is formed, the end of EOD of the partition #0 is set as the logical end position of the tape LEOT (Logical End of Tape). In this case, since partitions of N are formed, an optional device area is formed subsequently to EOD of the partition #0.

The device area which is just subsequent to the above head position PBOT serves as an area for loading/unloading of the partition #0, however, the optional device area at the end of the partition #0 serves as an area for loading/unloading of the partition #1.

Areas are set for the partition #1 like the partition #0, and an optional device area serving as an area for loading/unloading of a next partition #2 is formed at the end of the partition #1. Likewise, the same areas are formed for the subsequent partitions until the partition #(N−1).

An optional device area is unnecessary for the last partition #(N−1), and thus no optional device area is formed in the last partition #(N−1). The end of EOD of the partition #(N−1) is set as the logical tape end position LEOT (Logical End of Tape).

PEOT (Physical End of Tape) indicates the physical tape end position or the physical end position of the partition.

Figure 7A:
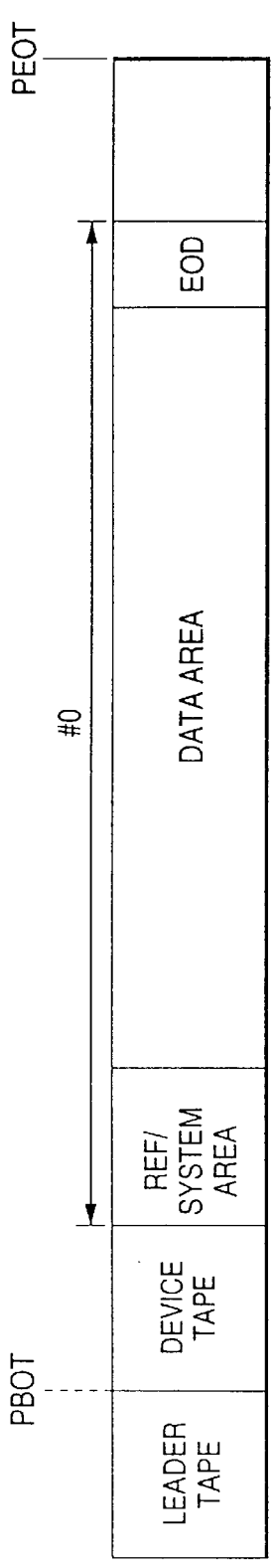
FIGS. 7A to 7C are diagrams showing the tape layout of each mode of the embodiment.
Figure 7B:
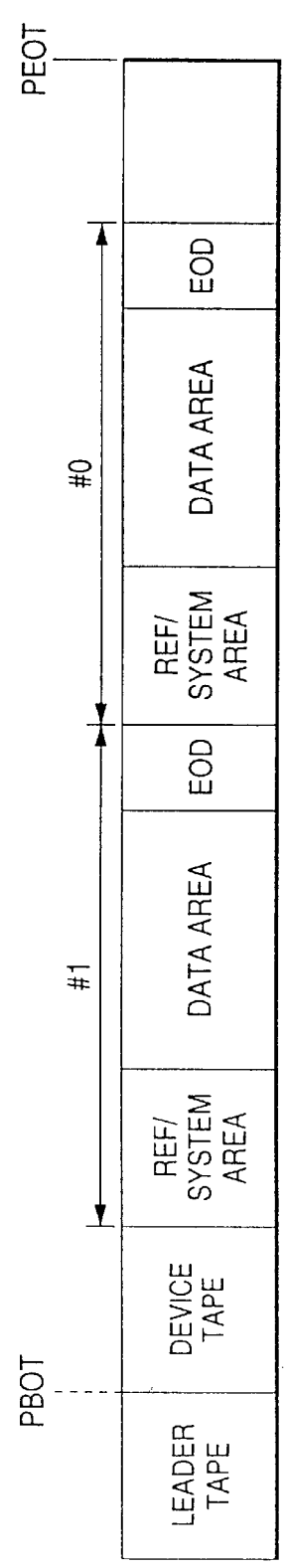
Figure 7C:
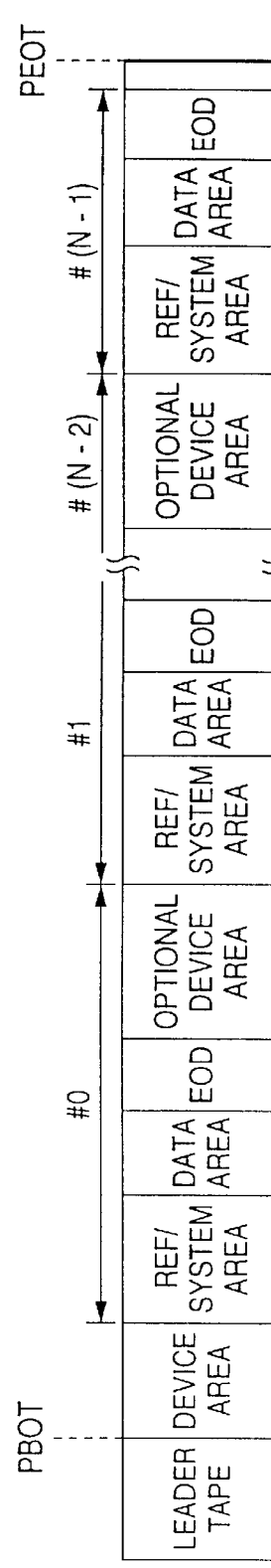

FIGS. 7A to 7C are diagrams showing tape layouts in the normal mode and the multi-partition mode.

FIG. 7A shows the tape layout when the tape is used in the 1-partition style in the normal mode. In this case, only the partition #0 is formed, and the data structure thereof is the same as the last partition #(N−1) shown in FIG. 6, for example. That is, no optional device area is provided to the last portion in the partition.

FIG. 7B shows the tape layout when the tape is used in the 2-partition style in the normal mode. In this case, the partitions #1, #0 are formed as shown in FIG. 7B. However, in the case of the 2-partition style in the normal mode, the arrangement order of the partitions #1, #0 is set so that the partition #1 is disposed at the head side of the magnetic tape and the partition #0 is disposed subsequently to the partition #1.

The normal mode of FIGS. 7A and 7B can be executed for both of a tape cassette with MIC 4 and a tape cassette with no MIC 4.

FIG. 7C shows the tape layout when the tape is used in the multi-partition mode and the partitions #0 to #(N−1) are formed.

In the case of the multi-partition mode, the arrangement order of the partitions is set so that the partition #0 is disposed at the forehead side of the magnetic tape and subsequently the partitions #1 to #(N−1) are sequentially formed in this order. An optional device area is provided at the last portion of each of the partitions excluding the partition #(N−1). That is, the tape layout is the same as show in FIG. 6A As described above, the device area in the vicinity of the tape top is set as an area for the loading/unloading, and the optional device area is prepared as an area to enable the loading/unloading on a partition basis (that is, the loading/unloading at some midpoint of the tape).

The tape layout in the multi-partition mode as shown in FIG. 7C can be realized for only the tape cassette with MIC 4.

4. Data Structure of MIC

Next, the data structure of MIC 4 equipped to the tape cassette 1 will be described.

Figure 8:
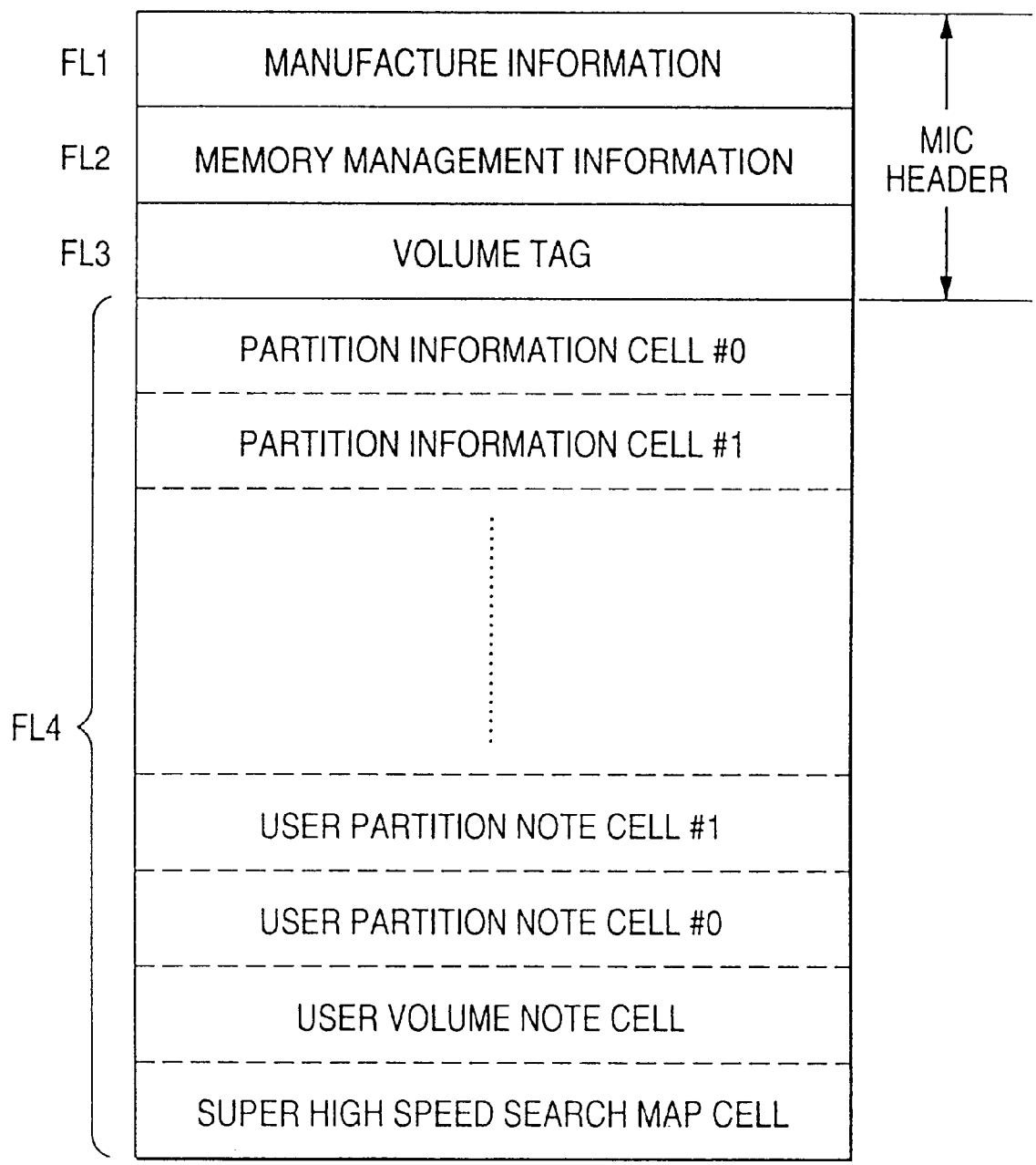
FIG. 8 is a diagram showing the data structure of MIC of the embodiment.

FIG. 8 schematically shows an example of the structure of data stored in MIC 4. As shown in FIG. 8, fields FL1 to FL4 are set as a storage area of MIC 4. Various information at the manufacturing time of a tape cassette, tape information at the initialization time of a tape, information of each partition, etc. are written in these fields FL1 to FL4.

The field FL1 is set as manufacturing information, and serves as a manufacture part in which the various information at the manufacturing time of the tape cassette is mainly stored.

The field FL2 is set as memory management information, and serves as a drive initialize part in which the information at the initialization time, etc. are mainly stored.

The field FL3 is set as a volume tag, and the basic management information of the whole tape cassette is stored therein.

The field FL4 is set as a memory free pool area, and management information can be additionally stored therein. The progress of the recording/reproducing operation and, if necessary, various information are stored in the memory free pool. A data group as a unit to be stored in the memory free pool will be hereinafter referred to as "cell".

First, partition information cells #0, #1, . . . representing management information for the respective partitions formed on the magnetic tape 3 are successively written into the memory free pool from the head side in this order. That is, the partition information cells whose number is equal to the number of the partitions formed on the magnetic tape 3 are formed.

Further, super high speed search map cells associated with map information for high-speed search are written into the memory free pool from the rear end thereof.

Subsequently, a user volume note cell and a user partition note cell are written from the rear end side of the memory free pool. The user volume note cell is associated with information such as a comment, etc. which are input on the overall tape cassette by a user, and the user partition note cell is associated with information such as a comment, etc. which are input on each partition by the user. Accordingly, these are stored in the memory free pool when the user instructs the writing of these information, and thus all of the information is not necessarily stored.

An intermediate area in which no information is stored is left as a memory free pool in which information will be written later.

The manufacture information of the field FL1 is designed in such a structure as shown in FIG. 9. The size (byte number) of each data is shown at the right side of FIG. 9.

First, information on checksum for the data of the manufacture information is stored as manufacture part checksum at the first 1-byte. The information of the manufacture part checksum is given at the time when the tape cassette is manufactured.

Subsequently, information from an MIC type until a write protected data byte counter is written as real data constituting the manufacture part. "Reserve" means a preliminary area in which data will be stored in the future. The meaning of "reserve" is the same in the following description.

An MIC type is the data indicating the type of MIC which is actually equipped to the tape cassette. An MIC manufacture date indicates the manufacturing year, month and day (hour) of MIC. An MIC manufacture line name indicates information on the name of a line along which MIC is manufactured. An MIC manufacture plant name indicates information on the name of a factory in which MIC is manufactured. An MIC manufacturer name indicates information on the name of a manufacturer of MIC. An MIC name indicates information on the name of a vender of MIC.

A cassette manufacture date, a cassette manufacture line name, a cassette manufacture plant name, a cassette manufacturer name and a cassette name indicate information on the cassette itself which is similar to the information on MIC described above.

An OEM customer name indicates information on the name of a partner company of OEM (Original Equipment Manufactures). A physical tape characteristic ID indicates information on the physical characteristics of the magnetic tape such as the material of the tape, the thickness of the tape, the length of the tape, etc., for example. Maximum clock frequency stores information on the maximum clock frequency of MIC. Maximum write cycle indicates information on the number of bytes of data which can be transmitted through one communication operation between MIC and the tape streaming drive 10 as the characteristic of MIC, for example. This information is dependent on the physical characteristic of a non-volatile memory used as MIC. MIC capacity indicates storage capacity information of MIC.

A write protect start address is used to protect data from being written into a desired part of MIC and indicates the start address of the write-protect area. A write protect byte count indicates the number of bytes of the write-protect area. That is, an area which occupies from the address indicated by the write protect top address by the byte number indicated by the area of the write protect count is set as a write-protect area.

Figure 10:
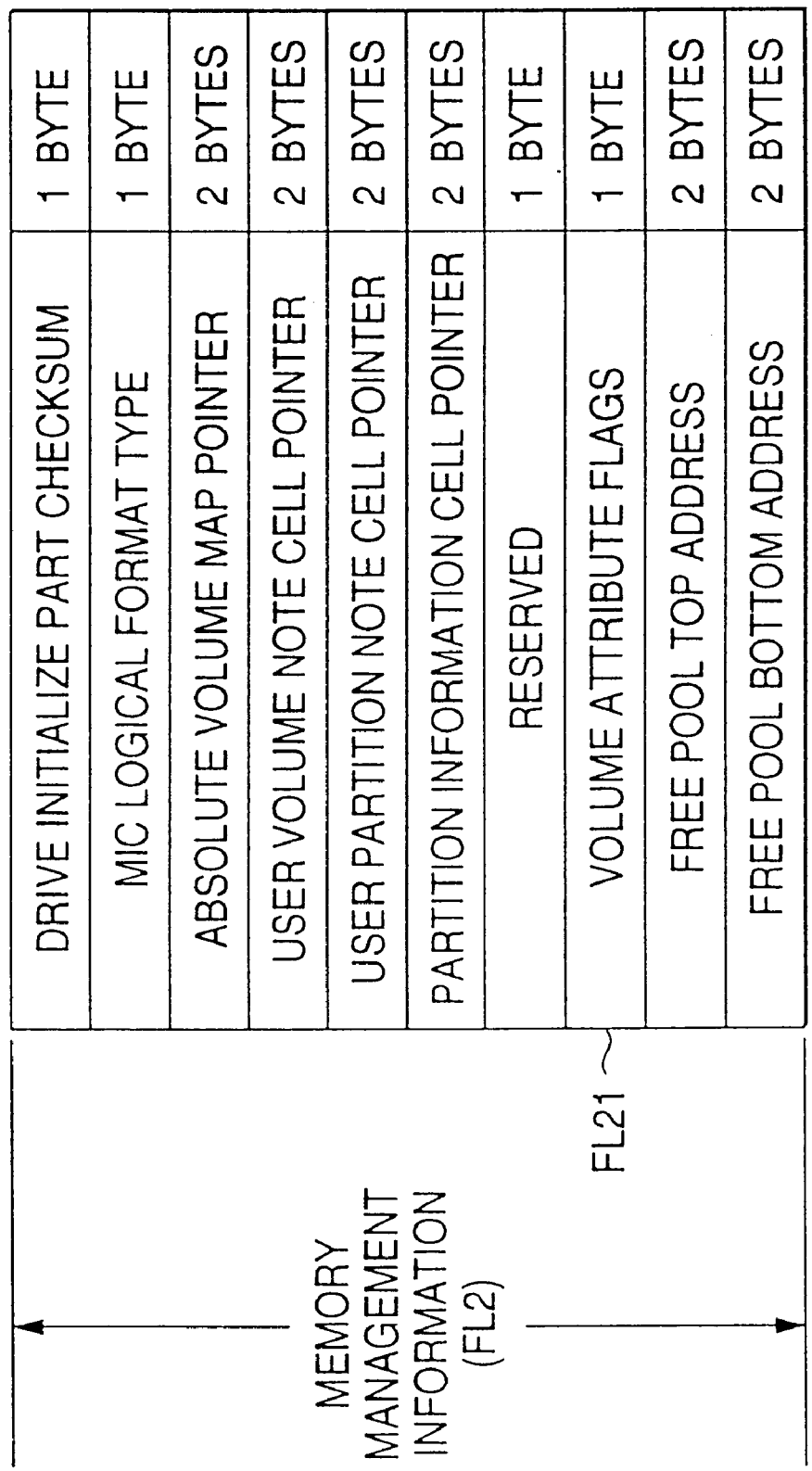
FIG. 10 is a diagram showing a drive initialize part of MIC of the embodiment.

Next, the structure of the memory management information of the field FL2 of FIG. 8 will be described with reference to FIG. 10. The size (byte number) of each data is shown at the right side of FIG. 10.

In memory management information is stored as drive initialize part checksum information on checksum for the data of the memory management information which is a drive initialize part.

The information from an MIC logical format type till a free pool bottom address is described as real data constituting the memory management information. First, the ID number of the logical format of MIC is stored as MIC logical format type. Various formats relating to a firm ware renewing tape MIC format, a reference tape MIC format, a cleaning cassette MIC format, etc. as well as a basic MIC format exist as MIC format, and the ID number corresponding to MIC format of the tape cassette concerned is indicated by MIC logical format type.

In an absolute volume map pointer is disposed a pointer indicating the head address of the super high speed search map cell area of FIG. 8. A user volume note cell pointer indicates a storage area from/into which data can be freely read/written (communicate) with the tape cassette via SCSI by the user, that is, the start address of the user volume note cell shown in FIG. 8.

A user partition note cell pointer indicates a storage area from/into which data can be freely read/written (communicate) with each partition via SCSI by the user, that is, the start address of the user partition note cell of FIG. 7. There is a case where a plurality of user partition note cells are stored. In this case, the user partition note cell pointer indicates the start address of the head cell of the plural user partition note cells. A partition information cell pointer indicates the start address of the partition information cell #0 of FIG. 8.

The partition information pieces whose number is equal to the number of the partitions formed on the magnetic tape 3 are successively written into the memory free pool. All the partition information cells #0 to #N are linked to one another in a link structure by a pointer. That is, the partition information cell pointer is set as a rout indicating the address of the partition #0, and the pointer of each of the subsequent partition information cells is disposed in the just-before partition information cell.

As described above, the position of each data in the field FL4 is managed by each pointer (absolute volume map pointer, user volume note cell pointer, user partition note cell pointer, partition information cell pointer).

A volume attribute flag is set as a 1-byte flag for supplying a logical write-protect tab for MIC 4. That is, the content indicated by MIC header flag contains write permission/protect (inhibition) into the manufacture part portion or write permission/protect (inhibition) into potions other than the manufacture part.

A free pool top address and a free pool bottom address indicate the start and end addresses of the memory free pool at that time in the field FL2, respectively. The area serving as the memory free pool varies in accordance with the writing or deletion of the partition information, the user partition note or the like, and thus the free pool top address and the free pool bottom address are renewed in accordance with the variation of the memory free pool area.

Figure 11:
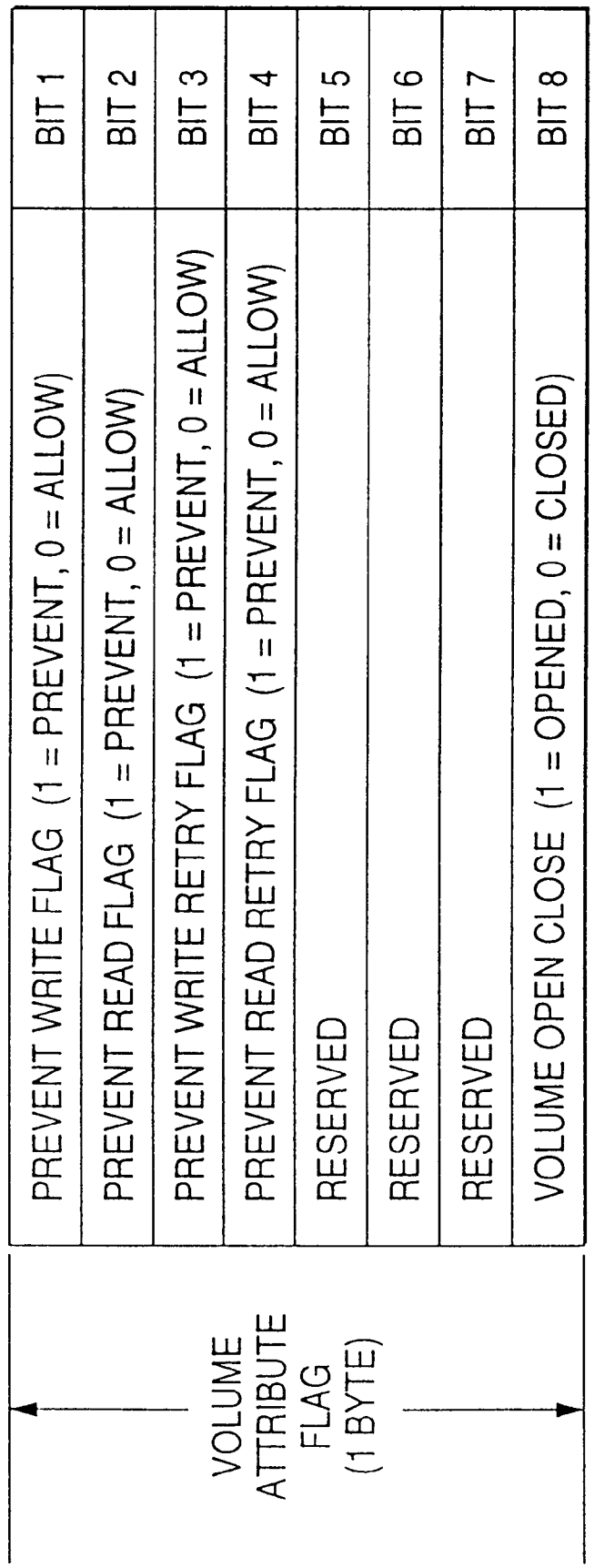
FIG. 11 is a diagram showing a volume attribute flag of MIC of the embodiment.

The volume attribute flag as the field FL21 in the memory management information shown in FIG. 10 will be described with reference to FIG. 11. The volume attribute flag has an area of 1 byte, and the flag content is defined for each of bits 1 to 8 as follows:

A first bit is set as a prevent write flag, a second flag is set as a prevent read flag, a third flag is set as a prevent write retry flag, and a fourth bit is set as a prevent read try flag, and these first to fourth flags are used for the write permission/prevent to the partition concerned, the read permission/prevent to the partition concerned, the data re-writing permission/prevent based on RAW in the recording operation and the data reading retry permission/prevent in the reproducing operation, respectively. In this case, if "1" is set to the flag, it means "prevent". If "0" is set to the flag, it means "permission".

Each of fifth to seventh bits is set as a non-defined (reserved) area. An eighth bit is set as a volume open close flag, and "1" (opened) is set to this flag while the recording is carried out on the magnetic tape, and "0" (closed) is set in response to the end of the recording operation.

Next, the structure of the volume tag of the field FL3 of FIG. 8 will be described with reference to FIG. 12. The size (byte number) of each data is shown at the right side of FIG. 12.

At the head of the volume tag is stored, as volume information checksum, information for data of volume information in which the basic management information of the whole tape cassette is stored. Further, as accumulative partition information checksum is stored information of checksum for data of accumulative partition information in which record information from the manufacturing time of the tape cassette is stored.

Subsequently to the volume note checksum and the volume note is provided a cartridge serial number in which a serial number having character information of 32 characters based on ASCII code is stored. In a manufacture ID is stored the code number of the manufacturer of the tape cassette 1 as a manufacturer identifier.

A secondary ID is set as a secondary identifier based on the type of the tape cassette 1, and attribute information of the tape is stored as a 1-byte code value in the secondary ID.

A cartridge serial number part checksum is set as checksum information for the cartridge serial number, the manufacture ID and the secondary ID. Each of specific volume tags 1 to 13 is set as "reserved" and the area thereof is composed of 36 bytes.

Next, the structure of the volume information FL31 of the field FL3 of FIG. 8 will be described with reference to FIGS. 13 to 15.

As shown in FIG. 13, information on checksum for the data of the volume information is stored as volume information checksum at the head 1-byte in the volume information FL31.

An eject status of 20 bytes, a reel diameter of 4 bytes, an initialize count of 3 bytes and a volume information on tape of 72 bytes are written as real data constituting the volume information.

The logical position information of the magnetic tape 3 when the tape cassette is unloaded is written in the eject status, and the reel diameter indicates the diameter information of the reel hubs 2A, 2B at the time when the tape cassette is unloaded.

The initialize count indicates the information of the initialization frequency of the magnetic tape 3.

The content of the volume information on tape FL312 is shown in FIG. 14.

As shown in FIG. 14, in the volume information on tape are written a super high speed search enable flag of 1 bit, a system log allocation flags of 2 bits, an always unload PBOT flag of 1 bit, an AIT/DDS flag of 1 bit, a last valid partition number of 1 byte and an optional device area allocation map of 32 bytes, except for "reserved" areas.

In this case, for the convenience's sake of description, the area of the system log allocation flag is shown as a field FL312a.

The super high speed search enable flag is set as a flag indicating whether a function of further enhancing the high-speed search by using the tape position information stored as the absolute volume map of MIC 4 is validated or not.

The system log allocation flag is set as a flag indicating where a system log to be preferentially used for use record (system log) of the tape cassette by the tape streaming drive is stored.

The defined content of the system log allocation flag will be described later.

The always unload PBOT flag is set as a flag indicating that even when the multi-partitions are formed on the magnetic tape 3 and also an optional device area exists in the partition, the unloading operation is carried out on the device area existing in PBOT.

An AIT/DDS flag indicates the mode of the tape cassette 1. A last valid partition number indicates the number of the last partition formed on the magnetic tape.

The optional device area map is composed of 256 bytes, and each 1-bit is connected to each of the partitions formed on the magnetic tape 3. If the bit value is set to "1", it indicates that an optional device area is formed in the partition corresponding to the bit concerned.

Here, the system log allocation flag indicated as the field FL321a in FIG. 14 will be described.

As understood from the foregoing and following descriptions, various kinds of desired management information (system log) containing the use record information on the magnetic tape can be set and stored in MIC 4. Further, with respect to the magnetic tape, system areas in which various management information can be stored are formed every partition as shown in FIGS. 6 and 7. In this embodiment, the information contents stored in MIC 4 are set to be substantially the same as the information set in the system areas on the magnetic tape.

As described with reference to FIG. 7, this embodiment has mainly two modes, the normal mode and the multi-partition mode, and the tape streaming drive 10 according to this embodiment has the compatible function which supports both the modes.

For example, when the recording/reproducing operation is carried out in conformity with the tape cassette 1 with MIC 4, the reference and the renewal of the system log are not carried out on the system area, but carried out on only MIC 4. That is, for the tape cassette 1 with MIC 4, the system log stored in MIC 4 is preferentially used irrespective of any situation where the tape cassette 1 is formatted in the normal mode or multi-partition mode.

On the other hand, when the recording/reproducing operation is carried out on a tape cassette which has no MIC 4 and supports only the normal mode, the reference and the renewal are necessarily carried out on the system log area on the magnetic tape because there is no MIC 4.

That is, in this embodiment, the location of the system log to be preferentially used is different between the tape cassette with MIC 4 and the tape cassette with no MIC 4. The system log allocation flag is defined as identifying information indicating the location of the system log to be preferentially used by the tape streaming drive as described above.

FIG. 15 shows the definition contents of the system log allocation flag.

As is apparent from FIG. 14, the system log allocation flag is expressed by two bits of the fourth and third bits in a predetermined 1-byte area. As shown in FIG. 15, in a case where [0,0] is set as the value of [fourth bit, third bit], it indicates that the system log (management information) to be preferentially used exists only on the magnetic tape. That is, it indicates the tape cassette which has no MIC and supports only the normal mode. In this case, the information of the system log allocation flag is recorded in a predetermined area of the system area on the magnetic tape.

In a case where [1,1] is set as the value of [fourth bit, third bit], the system log to be preferentially used exists only in MIC. That is, it indicates the tape cassette with MIC.

In the case of the tape cassette having MIC, for example when the magnetic tape is initialized, [1,1] is set as the value of [fourth bit, third bit] to the system log allocation flag in the system area on MIC and the magnetic tape.

In a case where [0,1] is set as the value of [fourth bit, third bit], it indicates that the system log to be preferentially used exists neither on the magnetic tape nor in MIC. In a case where [1,0] is set, the system log to be preferentially used exists both on the magnetic tape and in MIC.

However, any tape cassette and any format which support [0,1] or [1,0] as the value of [fourth bit, third bit] have not existed at present, and thus these values are not realistically usable. In other words, the system log allocation flag of the tape cassette to which this embodiment is applicable is set to any one of [0,0] and [1,1] as the value of [fourth bit, third bit] at present.

Next, the cell stored in the field FL4 shown in FIG. 8 will be described.

As described above, the partition information cell, the user partition note cell, etc. are stored in the field FL4.

Figure 16A:
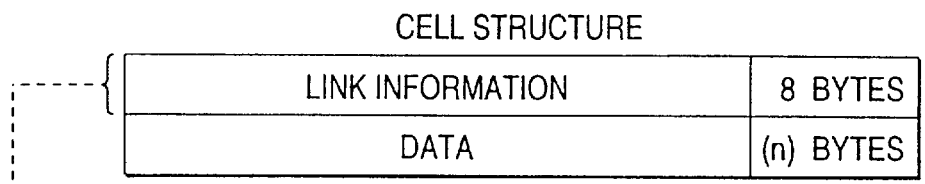
FIGS. 16A and 16B are diagrams showing the cell structure of MIC of the embodiment.
Figure 16B:
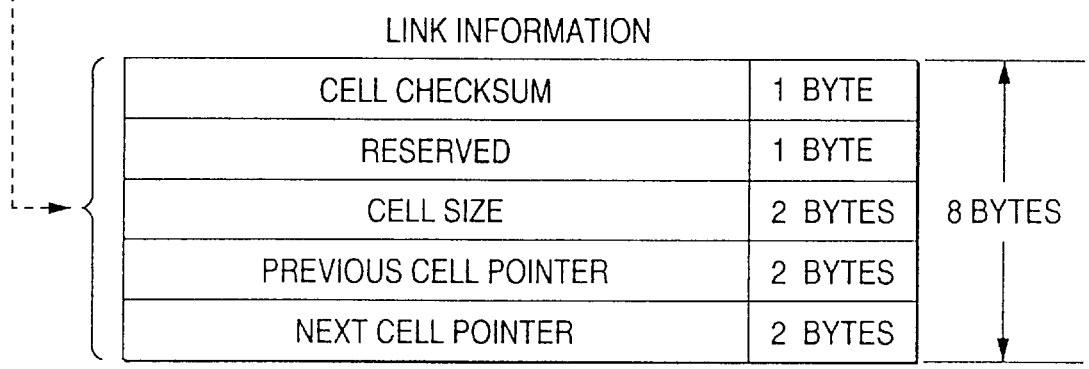

The structure of each of these cells is shown in FIGS. 16A and 16B.

A cell is composed of 8-byte link information and data of n bytes (n varies in accordance with the type of the cell) as shown in FIG. 16A.

The 8-byte link information is provided to each cell, and has a structure shown in FIG. 16B.

First, as shown in FIG. 16B, a 1-byte cell checksum is provided as a checksum on data in the cell. A 2-byte cell size indicates the size of the cell. A previous cell pointer and a next cell pointer are real linkage data (data for constructing a link structure), and when a plurality of cells of the same kind are linked to one another, the previous and next cells are indicated by the previous cell pointer and the next cell pointer.

A partition information cell, an absolute volume map information cell, a user volume note cell and a user partition note cell exist as cells having such a structure. The cell size of the partition information cell is set to a fixed value. The cell size of each of the other cells is variable.

The partition information cell having the fixed cell size will be described with reference to FIGS. 17 and 18.

Figure 17:
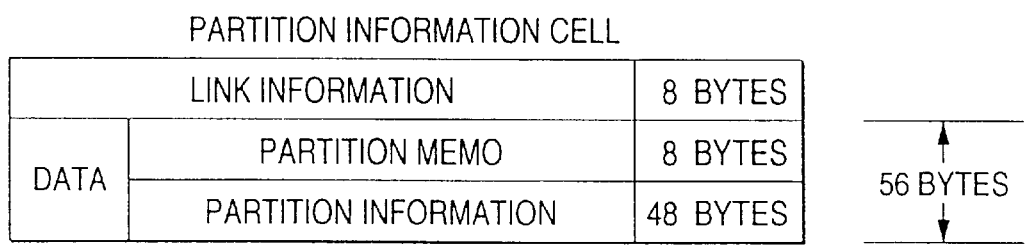
FIG. 17 is a diagram showing a partition information cell of MIC of the embodiment.

The partition information cell is composed of 8-byte link information and 56-byte data as shown in FIG. 17. 8 bytes in the 56-byte data are allocated as a partition memo, and 48 bytes are allocated as partition information.

In the partition information (system log) is stored various information relating to the use record of the partition corresponding to the cell on the magnetic tape. The tape streaming drive uses the information to manage the recording/reproducing operation thereof.

The data structure of the partition information in one partition information cell which corresponds to some partition is defined as shown in FIG. 18.

In 4-byte "previous group written" is stored information on the number of groups in the partition concerned physically-recorded on the magnetic tape, which is counted from the latest renewal of the partition information.

In 4-byte "total group written" is stored the total number of groups which have been recorded in the partition concerned until now. The total number is accumulated until the tape cassette is unusable or wasted due to its lifetime, for example. For example when data are being recorded on the magnetic tape 3 by the tape streaming drive, the value of each of the "previous group written" and "total group written" areas is incremented through the processing of the system controller 15 of the tape streaming drive in accordance with the number of groups which are newly recorded through the current recording operation.

3-byte "previous group read" indicates the number of physically read-out groups, which is counted from the latest renewal of the partition information concerned.

4-byte "total group read" indicates the accumulative value of the number of groups which have been read out from the partition concerned until now.

3-byte "total rewritten frames" indicate the accumulative value of the number of frames to which a data rewriting request is made on the basis of READ-AFTER-WRITE (hereinafter abbreviated as "RAW") in the partition concerned.

In the tape streaming drive of this embodiment, it is set as the RAW operation that the data of a frame written on the magnetic tape 3 are read out by a reproducing head 13C just after the writing operation of the data. The data of the frame thus read out through the RAW operation are subjected to error detection by the system controller 15. If it is detected that some error occurs, the recording system is controlled to rewrite the data of a frame which is detected to have the error. The accumulative value of the number of frames which are subjected to the rewriting operation as described above corresponds to the total rewritten frame.

A 3-byte total 3rd ECC count indicates the accumulative value of the number of groups which are subjected to error correction by using the C3 parity in the partition concerned.

In the tape streaming drive system, the data read out from the magnetic tape 3 are subjected to the error correction by using parity of C1, C2, C3. The parity of C3 is used when the data cannot be restored by using only the parities of C1, C2.

A 4-byte access count indicates the frequency of an access to the partition concerned on the magnetic tape by the tape streaming drive. A 4-byte update replace count indicates information on the accumulative value of the frequency at which the data rewriting (recording) operation on the partition concerned is carried out on the magnetic tape by updating. That is, it indicates the renewal frequency (recording frequency) for the partition concerned.

A 2-byte previous rewritten frames indicate information on the number of frames within a partition to which the data rewriting operation is requested, which is counted from the time when the partition information concerned is finally renewed through the RAW operation as described above.

A 2-byte previous 3rd ECC count indicates the number of groups which are subjected to the error correction by using the C3 parity, which is counted from the time when the partition information concerned is finally renewed. A 3-byte load counter indicates the accumulative value of the frequency at which the tape is loaded.

A serial number which starts from #1 and is incremented is allocated to each of the above frames located from the start position of the partition to the end position thereof, and this serial number corresponds to a frame number.

A 3-byte valid maximum absolute frame count indicates the information on the count value of the frames until the last frame which is judged to be valid in the partition concerned, that is, the maximum value of the frame number counted in an area which is judged to be valid in the partition concerned. This information is successively rewritten every time the data renewal is conducted on the partition concerned and the end position of the data area is altered.

On the other hand, the last 3-byte maximum absolute frame count of the partition information indicates count information of all the frames in the partition concerned. That is, it indicates the last frame number (maximum value) in a frame group constituting the overall partition concerned. Once a partition is formed by a pre-format, the above information is not afterwards rewritten and set to a fixed value dependent on the size (the number of frames) of the partition concerned.

The flag content for each bit is defined in the area of a 1-byte partition attribute flag.

That is, a first bit is prepared as a write prevent write flag for write permission/inhibition to the partition concerned, a second bit is prepared as a prevent read flag for read permission/inhibition to the partition concerned, a third bit is prepared as a prevent write retry flag for data rewriting permission/inhibition based on RAW in the recording operation, and a fourth bit is prepared as a prevent read retry for data reading retry permission/inhibition in the reproducing operation.

Each of fifth to seventh bits is set as a non-defined (reserved) area. An eighth bit is set as a partition open/close flag during the recording of the partition concerned and reset in response to the end of the recording operation.

A super high speed search map cell formed at the rear end of the field FL4 is designed in a cell structure having link information as shown in FIG. 19, and it is used as data map information required to implement the high-speed search function using the performance of the reel motor as much as possible without obtaining ID information from the magnetic tape 3 on a real-time basis.

The high-speed search function using the super high-speed search map cell operates as follows.

For example, logical position information is written into a high-speed search support map every time the tape runs at a distance of 10 m during the process of recording data on the magnetic tape 3, for example. When a desired file position on the magnetic tape 3 is required to be searched, the map is first checked to select a 10 m-unit position nearest to and in front of the desired file position with a sufficient margin being kept. Since the thickness of the tape and the diameter of the reel are known, the tape can be fed to the 10 m-unit position without reading any ID information on the tape by counting the pulses of the reel FG until the tape reaches the 10 m-unit position (estimated position). That is, the tape can be feed at a high speed at which it is impossible to read out ID from the magnetic tape. If the tape is fed to the estimated position at such a high speed, the running speed of the tape is reduced to such a speed that the ID data can be read out from the magnetic tape 3, and then a normal high-speed search is carried out and the file position indicated by a host computer is finally searched.

As described above, the data structure of the inside of MIC 4 is designed as shown in FIGS. 8 to 19. However, the data structure of MIC 4 is an example, and the data arrangement, area setting, data contents, data size, etc. are not limited to the above embodiment.

5. Compatible Support Operation of Tape Streaming Drive

The tape streaming drive 10 of this embodiment has a compatible function supporting both of the normal mode (1 partition, 2 partitions) and the multi-partition mode described in FIG. 7.

At present, even when there is any tape cassette 1 having the multi-partition supporting MIC 4, it is a general case that only the formatting in the normal mode is carried out on the tape cassette 1. That is, the magnetic tape is actually initialized in the normal mode to form 1 partition or 2 partitions irrespective of presence or absence of MIC as shown in FIG. 7A or 7B.

Figure 20:
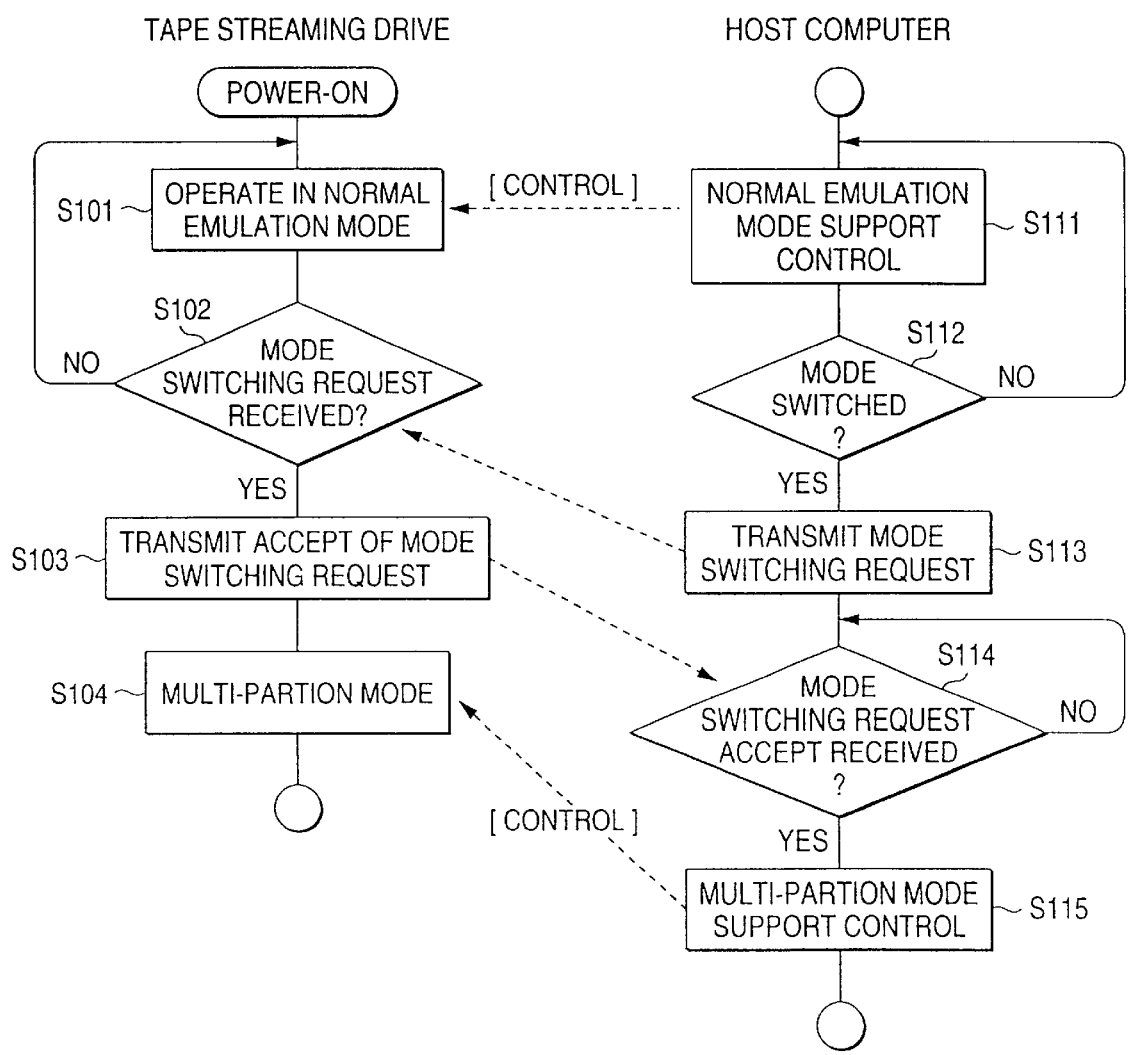
FIG. 20 is a flowchart showing the processing operation of implementing a compatible function which supports both of a normal mode and a multi-partition mode.

In consideration of the foregoing, the present tape streaming drive 10 is designed to support the compatible function according to the flowchart of FIG. 20. The processing of FIG. 20 is illustrated so that the processing operation at the tape streaming drive 10 side and the processing operation at the host computer 40 side are arranged in parallel. The processing at the tape streaming drive 10 side is executed by the system controller 16 of the tape streaming drive 10, and the processing at the host computer 40 side is executed, for example, by a CPU (Central Processing Unit) of the host computer 40 under the condition that an application software which can control the tape streaming drive 10 is started.

For example when the tape streaming drive 10 is powered, the normal emulation mode is set in the tape streaming drive 10 as shown instep S101. In the normal emulation mode, the system controller 15 control the operation of each functional circuit portion so that the various operations relating to the recording/reproducing operation executed by the tape streaming drive 10 are conformable with the normal mode (1-partition or 2-partition mode).

In the following description, an access operation to a partition will be picked up as an operation in the normal emulation mode and described.

The tape streaming drive 10 is originally designed to support the multi-partition mode. Accordingly, if a command requesting an access to a partition #0 is transmitted from the host computer 40, the tape streaming drive 10 accesses the partition at the head of the magnetic tape. Likewise, if a command requesting an access to a partition #1 is transmitted from the host computer 40, it accesses the second partition from the head of the magnetic tape. Through the above processing, an access can be executed in conformity with the multi-partition magnetic tape shown in FIG. 7C.

On the other hand, in the normal emulation mode, for example when a command requesting an access to the partition #0 is transmitted from the host computer 40, replacement processing of handing the partition #0, not as the head (first) partition, but as the second partition from the head is carried out through the processing of the system controller 15, and the control operation for an access after the replacement processing is executed. Likewise, when a command requesting an access to the partition #1 is transmitted, replacement processing of handling the partition #1 as the first partition from the head is executed, and the control operation for an access after the replacement processing is executed. As described above, the replacement processing described above is executed in the normal emulation mode, thereby enabling the access operation which is conformable with the 2-partition normal mode shown in FIG. 7B.

In the case of the 1-partition normal mode shown in FIG. 7A, only one partition exists on the magnetic tape, and the access operation to the partition as described above is unnecessary.

As described above, even for the tape cassette 1 with MIC 4, at present the formatting is executed in the 1-partition or 2-partition normal mode in most of cases. Therefore, the recording/reproducing operation can be properly performed in conformity with most of tape cassettes loaded, irrespective of a tape cassette with MIC or a tape cassette with no MIC, through the operation in the normal emulation mode described above.

The normal emulation mode of the tape streaming drive 10 is continued until a mode switching request command for switching the mode from the normal emulation mode to the multi-partition mode is transmitted from the host computer 40 in step S102, for example and received.

The program of an application software is assumed to be set at the host computer 40 so that various kinds of control can be performed on the assumption that the tape streaming drive 10 is in the normal mode in conformity with the operation of the normal emulation mode of the tape streaming drive 10 as shown in step S111.

When commands for various kinds of control are transmitted through the SCSI interface to the tape streaming drive 10 as the processing of the step S111, the various control processing corresponding to the commands thus transmitted can be executed at the tape streaming drive 10 under the normal emulation mode as the processing of the step S101. The various control processing based on the normal-mode assumption in the step S111 in the host computer 40 is continuously carried out until it is judged that the mode switching should be carried out in next step S112.

Since it is assumed that the tape cassettes are formatted in the normal mode irrespective of the presence or absence of MIC, the control operation in the host computer 40 and the recording/reproducing operation in the tape streaming drive 10 which respond to the control operation of the host computer 40 are normally completed by the processing at the side of the host computer 40 in step S111 and the processing at the side of the tape streaming drive 10 in step S101. However, even in the normal emulation mode, the processing in the tape streaming drive 10 is carried out on the tape cassette with MIC so that the reference and rewriting operation are carried out on the system log of MIC.

Here, if it is judged at the host computer side in step S112 that it must support the multi-partition mode for the communications with the tape streaming drive 10, the host computer 40 transmits the mode switching request to the tape streaming drive 10 as the processing of the step S113. In subsequent step S114, it awaits to receive a response to the mode switching request transmitted.

In the tape streaming drive 10, upon receiving the mode switching request command, the processing goes from step S102 to S103.

In step S103, a mode switching request response is transmitted as a response to the reception of the mode switching request transmitted. In subsequent step S104, the mode is switched to the multi-partition mode in accordance with the control command from the host computer 40.

Subsequently, the system controller 15 of the tape streaming drive 10 executes the control processing for the recording/reproducing operation based on the assumption that the tape cassette loaded is provided with MIC and further the magnetic tape is formatted to have three or more partitions.

If it is judged in step S114 by the host computer 40 that the mode switching request response is received, the processing goes to step S115 to switch the setting of the program of the application software so that various kinds of control based on the assumption that the tape streaming drive 10 is in the multi-partition mode can be executed.

Subsequently, the processing of the step S115 at the host computer side and the predetermined control processing in the step S104 which is responsive to the above processing of S115 are executed, thereby properly performing the control operation of the host computer 40 and the various operations of the tape streaming drive 10 responsive to the control operation which are conformable with the multi-partition mode.

6. System Log Allocation Recognition Processing

As described above, by switching the mode between the normal emulation mode and the multi-partition mode, the tape streaming drive 10 of this embodiment is allowed to support both formats in the normal mode and the multi-partition mode for the tape cassette with MIC, and further it is allowed to support the tape cassette with no MIC which supports only the format in the normal mode. That is, the tape streaming drive is provided with the compatible function which supports both of the normal mode and the multi-partition mode.

On the assumption that the tape streaming drive 10 of this embodiment has the mode compatible function described above, it identifies the location of a system log to be preferentially used by performing the following processing when a tape cassette is loaded. Further, for the tape cassette with MIC, when it is impossible to access MIC due to failure of MIC or the like, predetermined countermeasure processing described later is carried out to prevent occurrence of troubles in the recognition of the location of the system log.

Figure 21:
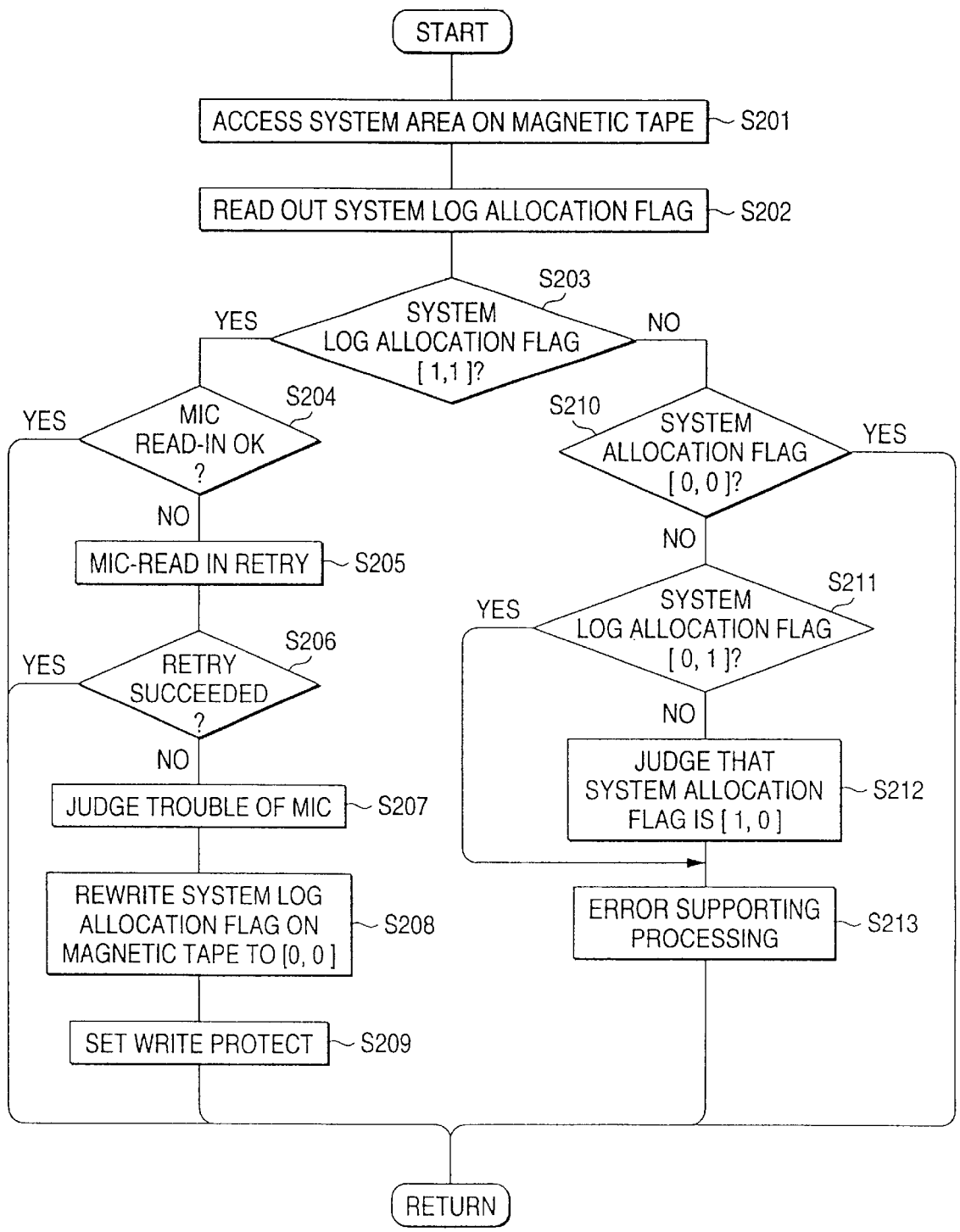
FIG. 21 is a flowchart showing location recognition of a system log area and MIC trouble supporting processing.

The flowchart of FIG. 21 shows the processing operation of recognizing the location of the system log when the tape cassette is loaded. This processing shown in FIG. 21 is assumed to be carried out under the condition that the system controller 15 sets the normal emulation mode described above.

When the tape cassette is loaded into the tape streaming drive 10, the processing shown in FIG. 21 is started.

At the time when the tape cassette is loaded, the loading of the magnetic tape is started. As described above, the loading operation is carried out in an optional device area contained in a partition just before a partition which was previously subjected to the recording/reproducing operation. Therefore, in step S201, an access is carried out on the system log area in a partition which is estimated to be located just after the optional device area loaded. In subsequent step S202 is carried out the control processing of reading out a system log allocation flag which is recorded in a predetermined area of the system log area thus accessed. Here, the value of the system log allocation flag thus read out is written into S-RAM 24, for example.

In subsequent step S203, the content of the system log allocation flag obtained in the step S202 is referred to and it is judged whether the value of [fourth bit, third bit] is set to [1,1] as described above. That is, it is judged whether the system log area to be preferentially used exists in MIC (tape cassette with MIC).

When the judgment result of the step S203 is positive, the processing goes to step S204 to access MIC and judge whether data reading is OK. Here, if the data reading from MIC is OK, the processing goes out of this routine to wait for a command from the host computer 40.

On the other hand, if the judgment result of the step S204 is negative, a retry operation of the data reading from MIC is carried out.

The contact failure at the contact point between MIC 4 and the tape streaming drive 10, the breaking of the memory element itself in MIC or the like may make it impossible to read out the data from MIC.

Therefore, when the retry operation is carried out, the control processing of slightly moving the support mechanism of the tape cassette or the like is carried out to restore the contact at the contact point between MIC and the tape streaming drive 10, and then the reading operation of the data from MIC is carried out again. Such processing is repetitively carried out at predetermined number of times. Accordingly, when the data reading operation from MIC is impossible because of the contact failure at the contact point between MIC 4 and the tape streaming drive 10, the retry operation may enable the data reading operation.

If the retry operation succeeds in the step S206, the processing goes out of this routine and then waits for some command from the host computer 40.

On the other hand, if the retry operation fails in the step S206, it is judged as the processing of the step S207 that some trouble occurs in MIC. For example, the trouble of the memory element itself as described above, the contact failure which is too strong to restore the reading operation through the retry operation or the like may be considered as a cause of the trouble.

In subsequent step S208, the processing of rewriting the value of [fourth bit, third bit] to [0,0] is carried out on the system log allocation flag on the magnetic tape. As described above, [0,0] indicates that the system log to be preferentially used exists on the magnetic tape.

As described above, for the tape cassette with MIC, [1,1] is stored or recorded in the system log allocation flag in the system area on the magnetic tape and the system log allocation flag in MIC at the initialization time.

Accordingly, when it is impossible to read out data from MIC because of the failure of MIC, [0,0] is set to the system log allocation flag in the system area on the magnetic tape as described above, so that it is subsequently recognized for at least the partition concerned that the system log to be preferentially used exists on the magnetic tape. This means that even when the tape cassette has MIC, it is regarded that MIC is logically separated from the tape cassette if MIC is out of order. That is, it is handled as the tape cassette with no MIC.

In subsequent step S209, the write protect is set to the tape cassette currently loaded. For this purpose, the system controller 15 carries out the subsequent processing on the assumption that "prevent ("1")" is set to the prevent write flag of the volume attribute flag shown in FIG. 11 out of the information of the system log owned by the tape cassette currently loaded, for example, whereby the data are prevented from being written onto the magnetic tape until the magnetic tape is unloaded. At the time when the above processing is completed, the processing goes out of this routine, and waits for some command from the host computer 40.

Here, the significance of the processing of the steps S208 and S209 which will be carried out if it is judged that MIC is out of order will be described.

For example, if MIC is out of order, error information indicating that an access is impossible due to failure of MIC in the normal multi-partition mode is transmitted to the host computer 40.

Here, the following disadvantage will occur if error information is erroneously transmitted to the host computer 40 as in the case of the operation in the multi-partition mode when the failure of MIC is judged in the step S207.

As described above, the processing shown in FIG. 21 corresponds to the operation in the normal emulation mode, and when the tape streaming drive 10 is in the normal emulation mode, the host computer 40 sets the processing system corresponding to the normal mode. Accordingly, even if error information is transmitted when the failure of MIC is judged in step S207, the host computer 40 cannot properly handle the error information indicating the failure of MIC because it executes the processing on the assumption that the normal mode is set, that is, it executes the processing in a mode which is not dependent on MIC.

Therefore, in the processing of step S208, the processing is executed at the tape streaming drive 10 side for a tape cassette having out-of-order MIC as if the tape cassette is logically regarded as a tape cassette having no MIC. Accordingly, no trouble would occur even if the host computer side subsequently controls the tape streaming drive 10 while the tape cassette currently loaded is regarded as a normal-mode tape cassette with no MIC.

That is, according to this embodiment, in such a situation that MIC is out of order, the countermeasure processing to the trouble of MIC is performed at the tape streaming drive side with no communication with the host computer side. The host computer side may perform the processing corresponding to the normal mode without executing any countermeasure processing.

The following should be noted for confirmation. That is, the countermeasure processing carried out when it is judged that MIC is out of order is carried out on the assumption that even when the tape cassette currently loaded is a tape cassette with MIC, it is actually formatted, not in the multi-partition mode, but in the 1-partition or 2-partition normal mode because the tape cassette with MIC is logically handled as a tape cassette with no MIC which supports only the normal mode.

In the case where a tape cassette with out-of-order MIC is handled as a tape cassette with no MIC as described above, when the data recording is afterwards performed on this tape cassette, the renewal of the system log which is required in connection with the progress of the recording operation is carried out on only the system log on the magnetic tape, and it is not carried out on MIC. Accordingly, a mismatch occurs between the content of the system log on the magnetic tape and the content of the system log in MIC. For example, considering such a case that the failure of MIC is afterwards repaired, such a state that the mismatch between the system log contents of the magnetic tape and MIC is preferably avoided as much as possible.

Therefore, if write protect is set to the system log of the magnetic tape by the processing of step S209 and only the reproducing operation is afterwards carried out, the renewal of the system log due to the recording is not carried out, and the mismatch between the system log contents of the magnetic tape and MIC can be reduced to the requisite minimum level.

Returning to FIG. 21, if a negative result is obtained in step S203, the processing goes to step S210 to judge whether [0,0] is set to the system allocation flag. That is, it is confirmed whether the location of the system log area to be preferentially used exists on the magnetic tape (the tape cassette is a tape cassette with no MIC). Here, if a positive result is obtained, the tape cassette currently loaded is afterwards handled as a tape cassette with no MIC, and the processing goes out of this process shown in FIG. 21 to wait for some command from the host computer 40.

On the other hand, if a negative result is obtained in step S210, the processing of the system controller 15 goes to step S211. In step S211, it is judged whether [0,1] is set to the system allocation flag. If a positive result is obtained, the processing goes to step S213. If a negative result is obtained, the processing goes to step S212.

In step S212, it is judged that [1,0] is set to the system allocation flag (actually, it is preferable to confirm whether the value of the system allocation flag is [1,0]), and the processing goes to step S213.

As described with reference to FIG. 15, [0,0], [0,1], [1,0] and [1,1] are defined for the system allocation flag, however, at present the system allocation flag is provided with only one of [0,0] and [1,1].

Accordingly, the case where the processing goes to step S213 corresponds to a case where [0,1] or [1,0] is set to the system allocation flag, and it means that a value which is actually unachievable is detected. It may be considered as a cause of this detection that some error occurs during the recording operation and an incorrect value is recorded as the system allocation flag on the magnetic tape. Alternatively, it may be also considered that an error occurs during the reading operation in step S202 and an incorrect value is detected.

Therefore, in step S213, it is judged that an error occurs in the content of the system allocation flag thus detected, and the processing corresponding to this judgment is carried out. As an example, it is considered that the system controller 15 carries out the processing of transmitting to the host computer error information indicating that an error occurs in the content of the system allocation flag. Alternatively, in consideration of a probability that a reproduction error occurs when the system allocation flag is read in step S202, a retry operation of returning to step S202 may be carried out.

When the processing shown in FIG. 21 is carried out, the system allocation flag is first read out from the system area on the magnetic tape. For example, it may be considered as a different procedure for the processing that an access to MIC is first tried, and at the time when the access fails, the processing of reading out the system allocation flag from the system area on the magnetic tape is started.

The processing of this embodiment does not go through a process of making an access to MIC at the first time. This is because this process is not perfect in consideration of reliability to actual MIC at present. That is, contact failure of MIC, inferiority of MIC as a memory itself, etc. may occur with some probability.

Accordingly, from the viewpoint of reliability as data holder (memory), the system log recorded on the magnetic tape can be more surely read out than that recorded in MIC. Therefore, in this embodiment, certainty (reliability) to achievement of the system allocation flag is enhanced by first accessing the magnetic tape.

The applicant of this application has proposed such a system that the communications between MIC 4 and the system controller 15 are performed in a wireless manner. The present invention is applicable to this system. That is, when a communication failure or the like occurs between MIC and the tape streaming drive and thus it is impossible to read out data from MIC, the processing which is conformable with the steps S204 to S209 of FIG. 21 may be carried out to complete the countermeasure processing to the failure of MIC at the tape streaming drive side without transmitting error information to the host computer side.

Further, this embodiment uses the tape streaming drive which supports a tape cassette of 8mm VTR as a recording medium, however, the present invention may be applied to a tape streaming drive which supports another type of tape cassette as a recording medium insofar it is provided with a memory element in which management information can be defined and stored for a cassette containing a tape-shaped recording medium.

What is claimed is:

1. A recording medium in which a magnetic tape is accommodated in a tape cassette, characterized in that:
   said magnetic tape has a management information area in which desired management information to manage a recording/reproducing operation on said magnetic tape is recorded, and
   said tape cassette is provided with a memory for storing management information corresponding to management information recorded in the management information area, wherein
   the management information area on said magnetic tape contains an area for recording management information location identifying information which indicates a location of preferential management information on one of said magnetic tape and said memory which is to be preferentially referred to by a tape drive device for performing the recording/reproducing operation in conjunction with the tape cassette.

2. A tape drive device which performs a recording/reproducing operation in conjunction with a tape cassette containing a magnetic tape having a management information recording area in which management information to manage the recording/reproducing operation on the magnetic tape is recorded, the device comprising:
   tape drive means for recording or reproducing information on or from the magnetic tape of the tape cassette loaded thereon;
   a memory;
   memory drive means for reading or writing memory management information having an information content common to management information to be recorded in the management information area on the loaded tape cassette when the management information is recorded in the memory;
   detection means for detecting management information location identifying information indicating a location of preferential management information on one of said magnetic tape and said memory that is to be preferentially referred to by said tape drive device from the management information read out from the magnetic tape by said tape drive means; and
   control means for identifying the location of the preferential management information based on the management information location identifying information detected by said detection means and controlling said memory drive means, so that when it is identified that the preferential management information exists in said memory, a reading trial operation of the management information stored in said memory is carried out, and when it is impossible to read out the management information from said memory as a result of the reading trial operation of the management information, said control means controls said tape drive means so as to write into the management information recording area of the magnetic tape the management information location identifying information indicating that the preferential management information exists in the management information recording area on said magnetic tape.

3. The tape drive device as claimed in claim 2, wherein when it is impossible to read out the management information from said memory as a result of the reading trial operation of the management information, said control means controls said tape drive means so that a recording permission/inhibition flag, which indicates permission/inhibition of recording data on the magnetic tape and which is contained in management information for a tape cassette currently loaded, is regarded as a recording inhibition flag, and only the reproducing operation of the magnetic tape is carried out.

4. The tape drive device as claimed in claim 2, wherein when it is judged on the basis of the management information location identifying information detected by said detection means that the preferential management information exists in the management information recording area of said magnetic tape, said control means controls said tape drive means to perform the recording/reproducing operation which is conformable with a tape cassette with no memory.

* * * * *